(12) United States Patent
DeMersseman

(10) Patent No.: US 10,162,159 B2
(45) Date of Patent: Dec. 25, 2018

(54) LENS FOR INTEGRATED RAIN SENSOR AND ANTENNA

(71) Applicant: Veoneer US Inc., Southfield, MI (US)

(72) Inventor: Bernard DeMersseman, Andover, MA (US)

(73) Assignee: VEONEER US INC., Southfield, MI (US)

( * ) Notice: Subject to any disclaimer, the term of this patent is extended or adjusted under 35 U.S.C. 154(b) by 0 days.

(21) Appl. No.: 15/385,050

(22) Filed: Dec. 20, 2016

(65) Prior Publication Data

US 2018/0172966 A1 Jun. 21, 2018

(51) Int. Cl.
| | |
|---|---|
| *G02B 5/20* | (2006.01) |
| *G02B 19/00* | (2006.01) |
| *B29D 11/00* | (2006.01) |
| *B29C 45/74* | (2006.01) |
| *B29C 45/00* | (2006.01) |
| *B29K 33/00* | (2006.01) |
| *B29L 11/00* | (2006.01) |

(52) U.S. Cl.
CPC ...... *G02B 19/0076* (2013.01); *B29C 45/0001* (2013.01); *B29C 45/74* (2013.01); *B29D 11/0048* (2013.01); *G02B 5/208* (2013.01); *G02B 19/0014* (2013.01); *G02B 19/0061* (2013.01); *B29K 2033/00* (2013.01); *B29K 2995/003* (2013.01); *B29K 2995/0006* (2013.01); *B29K 2995/0027* (2013.01); *B29L 2011/0016* (2013.01)

(58) Field of Classification Search
CPC .... G02B 2003/0093; G02B 3/00; B60R 1/12; B60R 2001/1223; B60R 2001/1261; B60R 2001/1284; B60R 2300/108; G01N 27/223; B60S 1/0825; B60S 1/0818; B60S 1/0833; B60S 1/0837; B60S 1/0844; B60S 1/0848; B60S 1/0874; B60S 1/0881; B60S 1/0885; B60S 1/0888
USPC ....... 359/642, 726, 727, 733, 734, 735, 736, 359/737, 741, 754, 771, 784, 793, 796, 359/797, 808, 809, 811, 819; 250/338.1, 250/339.01, 339.02, 339.06, 339.1, 250/339.11, 341.8, 201.1, 2, 16, 573, 574
See application file for complete search history.

(56) References Cited

U.S. PATENT DOCUMENTS

| | | | |
|---|---|---|---|
| 5,898,183 A * | 4/1999 | Teder | B60S 1/0822 250/574 |
| 6,337,491 B1 | 1/2002 | Krieg et al. | 250/573 |
| 6,417,810 B1 | 7/2002 | Huels et al. | 343/713 |

(Continued)

*Primary Examiner* — Arnel C Lavarias
(74) *Attorney, Agent, or Firm* — Christopher P. Maiorana, PC

(57) ABSTRACT

A molded lens assembly includes a cover and at least four molded elongated features. The cover may have a substantially planar portion and side portions extending away perpendicularly at a periphery of the substantially planar portion and defining an inner surface of the substantially planar portion. The at least four molded elongated features generally extend away from the inner surface of the substantially planar portion and are arranged such that a long axis of each of the molded elongated features is aligned with a side of a polygon having a number of sides equal to the number of molded elongated features. Each molded elongated feature generally includes a first convex lens portion at a first end and a second convex lens portion at a second end.

19 Claims, 21 Drawing Sheets

(56) References Cited

U.S. PATENT DOCUMENTS

| | | | |
|---|---|---|---|
| 7,023,379 B2 | 4/2006 | Turnbull | 342/357.1 |
| 7,236,249 B1 * | 6/2007 | Michenfelder | B60S 1/0822 356/445 |
| 8,288,711 B2 | 10/2012 | Heslin et al. | 250/239 |
| 8,634,988 B2 | 1/2014 | Veerasamy | 701/36 |
| 9,871,290 B1 * | 1/2018 | DeMersseman | H01Q 1/44 |
| 2003/0074962 A1 * | 4/2003 | Sautter | B60S 1/0822 73/170.17 |
| 2005/0119418 A1 * | 6/2005 | Matsumoto | G02B 1/04 525/329.7 |
| 2006/0043322 A1 * | 3/2006 | Ishikawa | B60S 1/0822 250/573 |
| 2008/0116379 A1 * | 5/2008 | Teder | B60S 1/0822 250/341.1 |
| 2011/0054794 A1 * | 3/2011 | Teder | G01N 21/552 702/3 |

\* cited by examiner (a)

(b)

LENS FOR INTEGRATED RAIN SENSOR AND ANTENNA

This application relates to U.S. application Ser. No. 15/384,916, filed Dec. 20, 2016, now U.S. Pat. No. 9,871,290, and U.S. application Ser. No. 15/384,984, filed Dec. 20, 2016, which are each incorporated by reference in their entirety.

FIELD OF THE INVENTION

The invention relates to vehicle sensing systems generally and, more particularly, to a method and/or apparatus for implementing a lens for an integrated rain sensor and communication antenna.

BACKGROUND

Conventional light/rain sensors and communication antennae are implemented as separate standalone modules. Rain sensor modules are attached to vehicle windshields. The antennae are mounted either below the dashboard, behind the windshield or in a module on the roof, a so-called shark fin antenna module. The space behind the rearview mirror is highly desirable due to the fact that it is wiped, it has open sky visibility, and it faces the direction of travel. However, the space behind the rearview mirror is limited, especially in compact vehicles.

It would be desirable to implement a lens for an integrated rain sensor and communication antenna.

SUMMARY

The invention concerns a molded lens assembly including a cover and at least four molded elongated features. The cover may have a substantially planar portion and side portions extending away perpendicularly at a periphery of the substantially planar portion and defining an inner surface of the substantially planar portion. The at least four molded elongated features generally extend away from the inner surface of the substantially planar portion and are arranged such that a long axis of each of the molded elongated features is aligned with a side of a polygon having a number of sides equal to the number of molded elongated features. Each molded elongated feature generally includes a first convex lens portion at a first end and a second convex lens portion at a second end.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a lens for an integrated rain sensor and communication antenna that may (i) provide rain sensing, (ii) provide ambient light sensing, (iii) provide tunnel detection, (iv) provide sunload sensing, (v) take advantage of space behind a rearview mirror; (vi) integrate several features together, (vii) provide a more compact solution when compared with existing standalone solutions, (viii) offer a lower cost solution when compared with standalone solutions, (ix) enable faster assembly, (x) enable physical integration of optical rain sensing with an RF antenna, (xi) facilitate global location determination by one or more satellite constellations such as GPS-Glonass-Beidou-Gallileo, (xii) facilitate connectivity such as vehicle-to-vehicle (V2V), vehicle-to-infrastructure (V2I), and vehicle-to-everything (V2X) communication, (xiii) be implemented on a single printed circuit board, and/or (xiv) utilize a novel molded lens structure.

Figure 1:
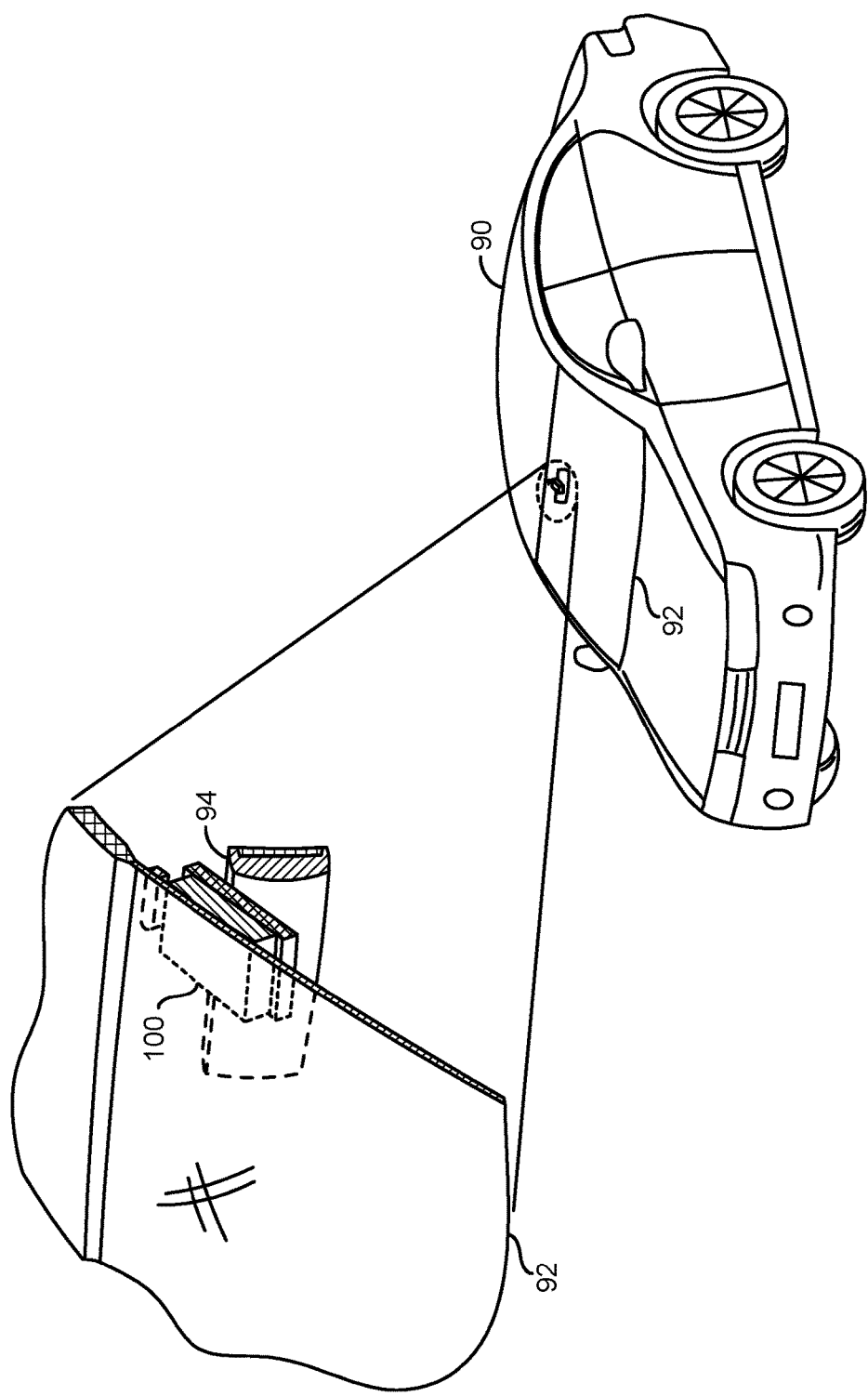
FIG. 1 is a diagram illustrating a vehicle having an integrated light/rain sensor and communication antenna module in accordance with an embodiment of the invention.

Referring to FIG. 1, a diagram is shown illustrating placement of an integrated light/rain sensor and communication antenna module in accordance with an example embodiment of the invention in a vehicle context. In various embodiments, the space behind the rearview mirror 94 of a vehicle 90 provides a desirable location for mounting an integrated light/rain sensor and communication antenna module 100 in accordance with an embodiment of the invention. The integrated light/rain sensor and communication antenna module 100 is generally mounted on a back (interior) surface of a windshield 92 of the vehicle 90. In various embodiments, the integrated light/rain sensor and communication antenna module 100 is attached to the windshield using a transparent adhesive material (or gasket). The location on the windshield behind (or near) the rearview mirror is desirable because it is wiped, it has open sky visibility, and it faces the direction of travel of the vehicle 90.

Figure 2:
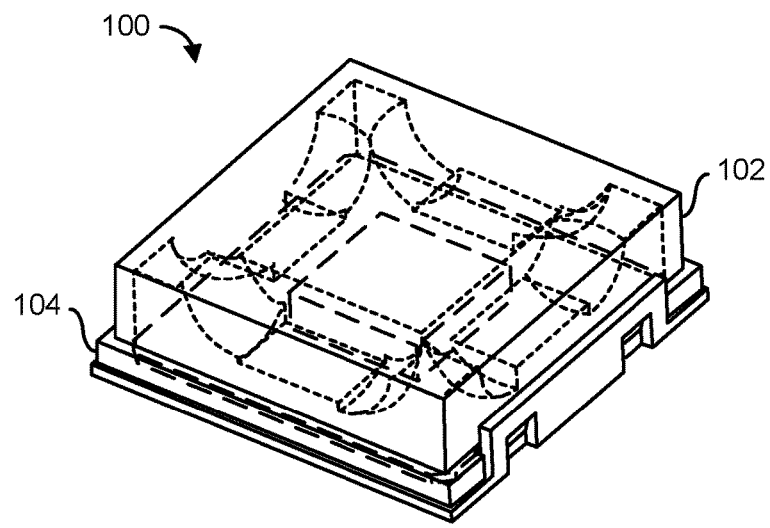
FIG. 2 is a diagram illustrating an example implementation of an integrated light/rain sensor and communication antenna module in accordance with an example embodiment of the invention.

Referring to FIG. 2, a diagram is shown illustrating an example implementation of the integrated light/rain sensor and communication antenna module 100 of FIG. 1. In various embodiments, the integrated light/rain sensor and communication antenna module 100 comprises a front (or upper) cover 102 and a back (or lower) cover 104. The covers 102 and 104 generally encase a single printed circuit board with a communication antenna (illustrated by long dashed lines). The cover (or lens assembly) 102 generally includes a plurality of molded elongated features comprising pairs of convex lenses (illustrated by short dashed lines). In various embodiments, the cover 102 may be formed from opaque infrared transmitting filter plastic. In various embodiments, the molded lens assembly and cover 102 may comprise a dielectric, microwave and infrared transparent, moldable plastic material (e.g., an acrylic infrared transmitting resin). In various embodiments, the molded lens assembly 102 may be configured to provide at least four optical paths and a central atrium. The four optical paths are generally arranged orthogonally, such that adjacent optical paths are at right angles to one another (e.g., in x-y plane). However, other numbers of light paths surrounding a central atrium may be implemented accordingly, with each light path aligned with (or forming) a side of a polygon (e.g., square, hexagon, octagon, etc.). In various embodiments, the orthogonal (or polygonal) layout of the optical paths provides an open atrium (or cavity or space) in the center of the optical paths, in which the communication antenna may be placed. In various embodiments, the covers 102 and 104 may be configured to snap together for easy assembly. However, other methods of assembling (fastening) the covers 102 and 104 (e.g., cementing, gluing, fusing, etc.) may be implemented.

Figure 3:
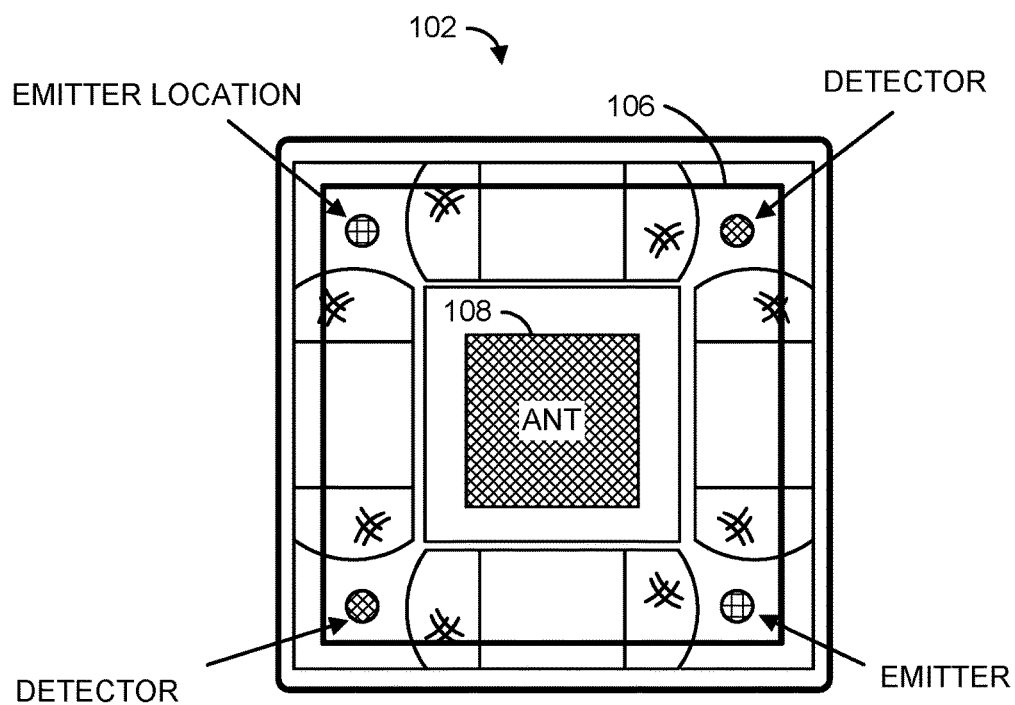
FIG. 3 is a diagram illustrating a top view of an integrated light/rain sensor and communication antenna module in accordance with an example embodiment of the invention.

Referring to FIG. 3, a diagram is shown illustrating a top view of the integrated light/rain sensor and communication antenna module 100 in accordance with an example embodiment of the invention. In various embodiments, the cover 102 and a printed circuit board 106 are arranged such that (i) the four optical paths provided by the molded elongated lens features are aligned with a periphery of the printed circuit board 106 and (ii) emitters and detectors (e.g., located in corners of the printed circuit board) are positioned at intersections of two adjacent optical paths of the molded elongated lens features. In various embodiments, the emitters and detectors are located in opposite corners of the printed circuit board (e.g., emitters on one diagonal of a square printed circuit board and detectors another diagonal of the square printed circuit board).

In various embodiments, the printed circuit board 106 is configured to keep emitter-detector spacing within 45×45 mm. In some embodiments, the printed circuit board 106 is configured to provide a maximum emitter-detector spacing of 40 mm. In still other embodiments, the printed circuit board 106 is configured to provide an emitter-detector spacing of approximately 37 mm. A communication antenna 108 may be implemented or mounted in a central area of the printed circuit board 106, and fitting within the cavity defined by the molded elongated lens features of the cover 102. In various embodiments, the printed circuit board 106 implements a ground plane for the communication antenna 108. In some embodiments, the ground plane may be on a front (windshield-facing) side of the printed circuit board 106. In some embodiments, the ground plane may be implemented within a layer of the printed circuit board 106. In various embodiments, the detectors may be mounted on a backside (e.g., opposite to the windshield-facing/ground plane side) of the printed circuit board 106. In various embodiments, the detectors may be mounted looking through via holes in the printed circuit board 106. In an example, the via holes may be implemented with a diameter of about 1.2 mm.

Figure 4:
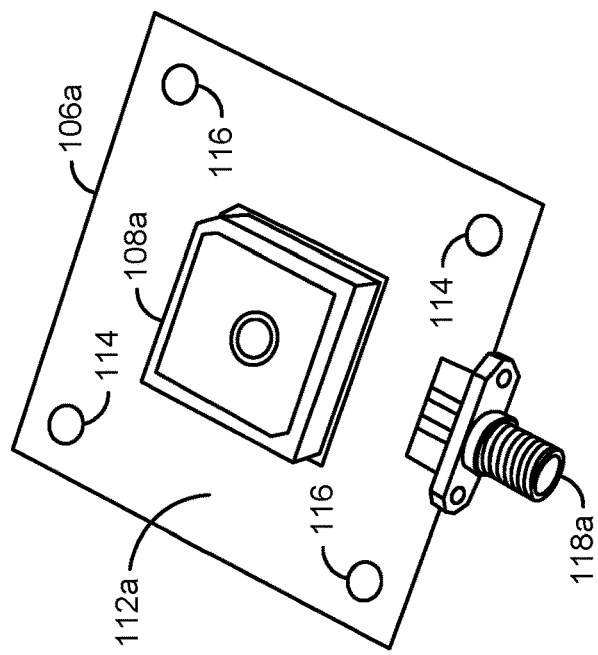
FIG. 4 is a diagram illustrating example communication antennae of the integrated light/rain sensor and communication antenna module of FIG. 1.
Figure 4:
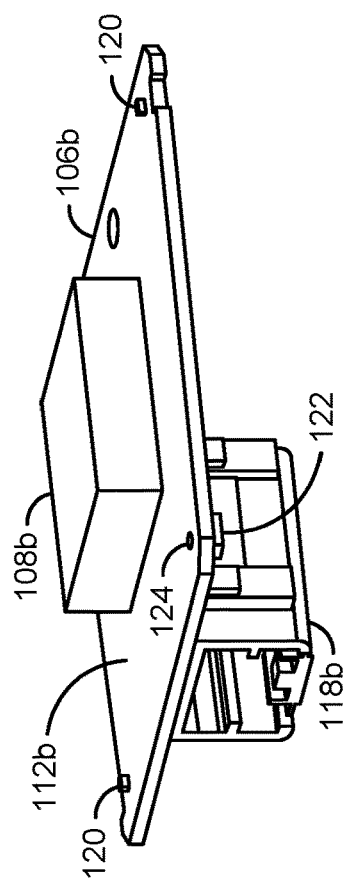

Referring to FIG. 4, a diagram is shown illustrating example implementations of the communication antenna 108 of FIG. 3. In some embodiments, a printed circuit board 106a may comprise an antenna 108a, a ground plane 112a, a pair of emitter vias 114, a pair of detector vias 116, and an RF connector 118a (e.g., a MOLEX FAKRA connector). In some embodiments, a printed circuit board 106b may comprise an antenna 108b, a ground plane 112b, a pair of emitters 120, a pair of detectors 122, and an RF connector 118b (e.g., a MOLEX Mini50 connector). In an example, the emitters 120 may be mounted on the windshield-facing side of the printed circuit board 106b and the detectors 122 may be mounted on the backside of the printed circuit board 106b in alignment with vias 124. In some embodiments, a through hole emitter (e.g., having a flat front surface) may allow the emitters 120 to be mounted on the backside of the printed circuit boards 106a and 106b in alignment with corresponding vias (not shown).

In various embodiments, the antenna 108a and the antenna 108b may be implemented, for example, as a TAOGLAS surface mount SGP.18c GPS L1 band 18×18 mm ceramic patch antenna, with 45×45 mm ground planes on 1.2 mm thick printed circuit boards. However, other radiating elements may be considered for the antennae 108a and/or 108b, including but not limited to a TYCO dual band GPS L1 -V2x puck antenna, other GPS L1 band ceramic patch antennae, a stacked multiband patch antenna, a folded dipole antenna, an inverted F cellular band antenna, an IEEE 802.11 a/b/g/n "WiFi" antenna, a XM satellite radio antenna, an IEEE 802.15.1 BLUETOOTH antenna, an IEEE 802.15.4 ZIGBEE antenna, an IEEE 802.11p 5.9 GHz antenna for vehicle-to-vehicle (V2V) or vehicle-to-infrastructure (V2I), referred to collectively as vehicle-to-everything (V2X), etc. IEEE 802.11p is an approved amendment to the IEEE 802.11 standard to add wireless access in vehicular environments (WAVE), a vehicular communication system. IEEE 802.11p defines enhancements to 802.11 (e.g., found in products marketed as Wi-Fi) that support Intelligent Transportation Systems (ITS) applications.

Figure 5:
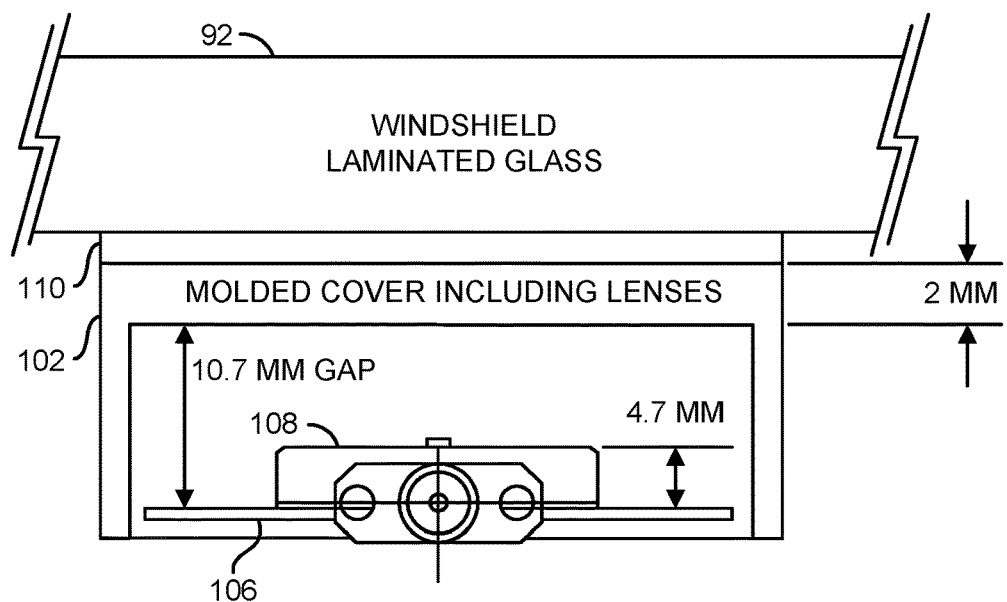
FIG. 5 is a diagram illustrating example vertical dimensions of an integrated light/rain sensor and communication antenna module in accordance with an embodiment of the invention.

Referring to FIG. 5, a diagram is shown illustrating example vertical dimensions of an integrated light/rain sensor and communication antenna module in accordance with an embodiment of the invention. In various embodiments, the integrated light/rain sensor and communication antenna module 100 is attached to the backside of the windshield 92 by a transparent adhesive material (or gasket) 110. The windshield 92, the cover 102, and the gasket material 110 generally have similar indexes of refraction (e.g., n=~1.5). In various embodiments, the integrated light/rain sensor and communication antenna module 100 may be configured to accommodate a range of windshield thicknesses (e.g., 4.8 to 6.0 mm). In an example, the integrated light/rain sensor and communication antenna module 100 may be configured for a windshield thicknesses range of 5.4+/−0.6 mm, and windshield radius of at least 1400 mm.

In various embodiments, an essentially planar portion of the cover 102 that is cemented on the backside (interior) of the windshield has a thickness of approximately 2 mm. The printed circuit board 106 is generally attached to the cover 102 such that there is a gap of approximately 10.7 mm between an interior surface of the planar portion of the cover 102 and the front (windshield-facing) surface of the printed circuit board 106. The gap generally accommodates a vertical dimension of the molded elongated lens feature portions of the cover 102 (not shown for clarity) and a vertical dimension (e.g., 4.7 mm) of the antenna 108.

Figure 6:
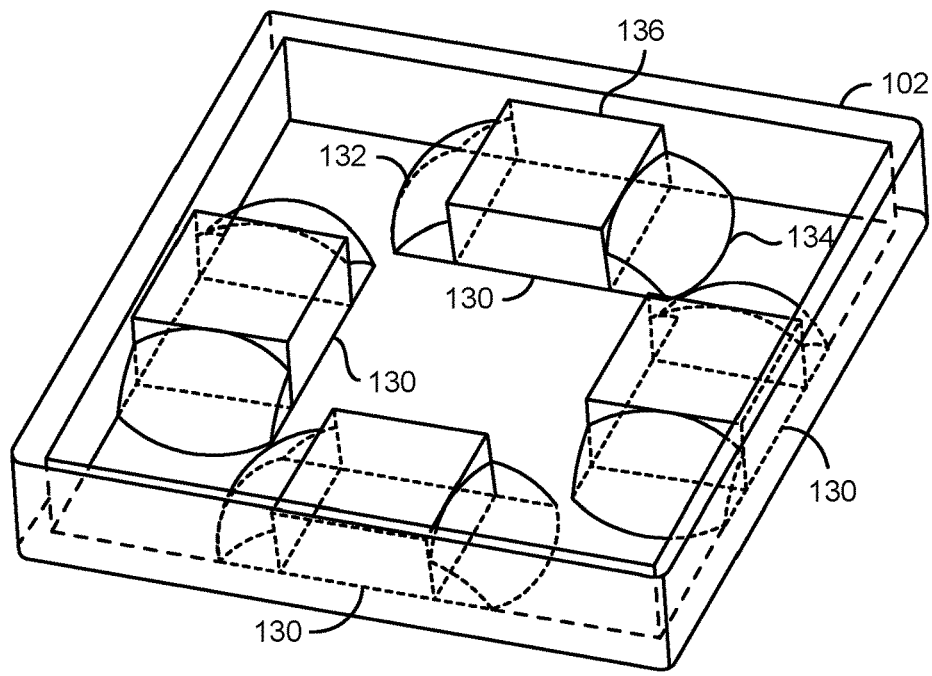
FIG. 6 is a diagram illustrating a bottom (inner) surface of a lens assembly of an integrated light/rain sensor and communication antenna module in accordance with an example embodiment of the invention.

Referring to FIG. 6, a diagram is shown illustrating an example bottom (inner) surface of the molded cover and lens assembly 102 in accordance with an embodiment of the invention. In various embodiments, the cover and molded lens assembly 102 may comprise four molded elongated lens features 130. In four light path embodiments, the molded elongated lens features 130 are laid out orthogonally (perpendicular) to one another. Each feature 130 comprises a first convex lens portion 132 and a second convex lens portion 134. In some embodiments, a filled solid region 136 may be formed between the first and second portions of one or more of the molded elongated lens features 130. The filled solid region 136 may be omitted without affecting functionality of the lens assembly 102. One or more of the filled solid region 136 may be configured to provided other optical sensor functionality (e.g., a tunnel sensor, a sunload sensor, etc.).

The first convex lens portion 132 and a second convex lens portion 134 are generally filled solids. A curvature of the lens portions 132 and 134 is configured to allow operation over a range of windshield thicknesses. The molded lens assembly and emitter-detector spacing are generally configured to implement an optical path providing an angle of incidence to obtain total internal refraction at the front surface of the windshield 92. In various embodiments, the convex lens portions 132 and 134 are configured for an angle of incidence greater than 42 degrees (e.g., 45 degrees).

Figure 7:
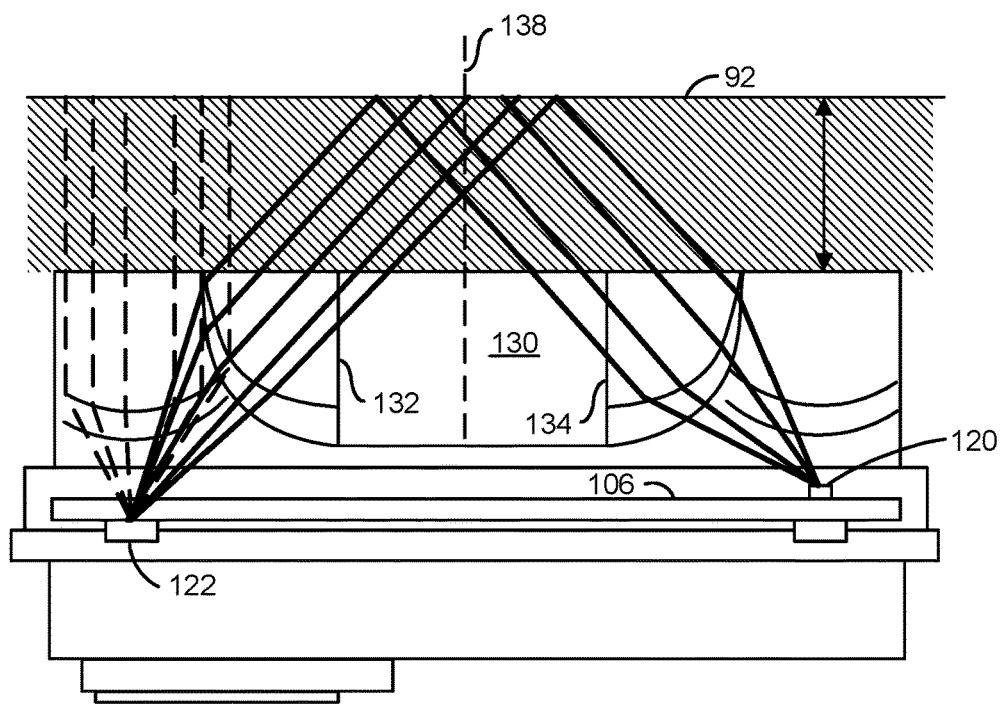
FIG. 7 is a diagram illustrating example light paths of an integrated light/rain sensor and communication antenna module in accordance with an example embodiment of the invention.

Referring to FIG. 7, a diagram is shown illustrating example light paths of the integrated light/rain sensor and communication antenna module 100 with the lens assembly of FIG. 6. In general, light (e.g., infrared light) emitted by an emitter mounted on the front surface of the printed circuit board 106 passes through the lens portion 134 and is collimated and directed toward a plane 138 that bisects the elongated lens feature 130. At the outer surface of the windshield 92, the light is refracted internally and travels toward the lens portion 132. The lens portion 132 focuses the refracted light on the detector 122 (e.g., through a via in the printed circuit board 106). Each detector 122 can receive light from each of the emitters 120 using a different optical path/feature 130. In some embodiments, the emitters 120 are alternately switched on, and both of the detectors 122 are sampled. In some embodiments, the emitters 120 may be modulated with different frequencies to allow each detector 122 to measure ambient and both optical paths simultaneously.

Figure 8:
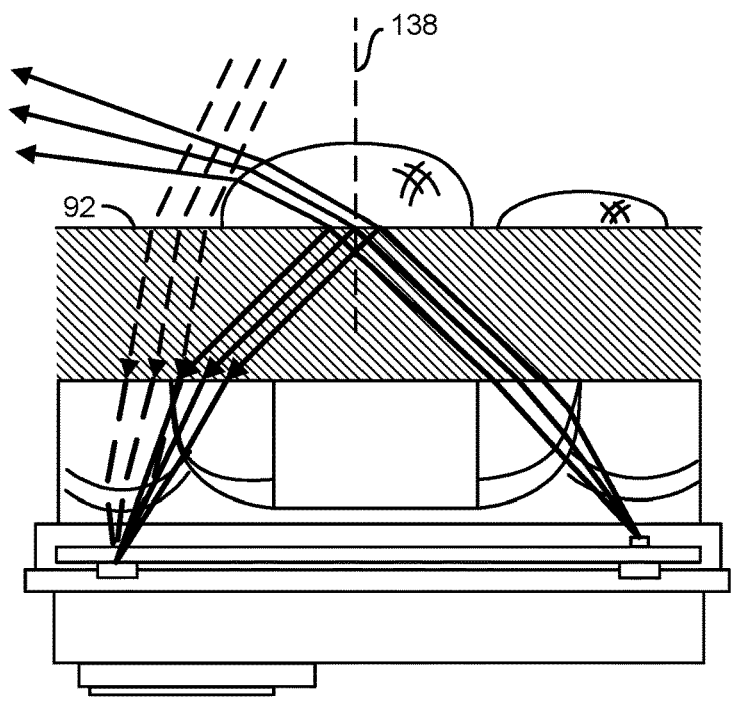
FIG. 8 is a diagram illustrating an effect of a raindrop on the light path of FIG. 7.

Referring to FIG. 8, a diagram is shown illustrating an effect of a raindrop on the light path of FIG. 7. The amount of rain on the windshield 92 generally affects the intensity of light reflected/refracted to the detector 122. When the windshield 92 is dry, total internal refraction of the light occurs. When a raindrop is present, some of the light "leaks" from the windshield 92, reducing the intensity of light seen by the detector 122. The detector signal is generally interpreted to estimate the rainfall rate and a control signal generated to control a vehicle component (e.g., the speed of the wipers) automatically.

Figure 9:
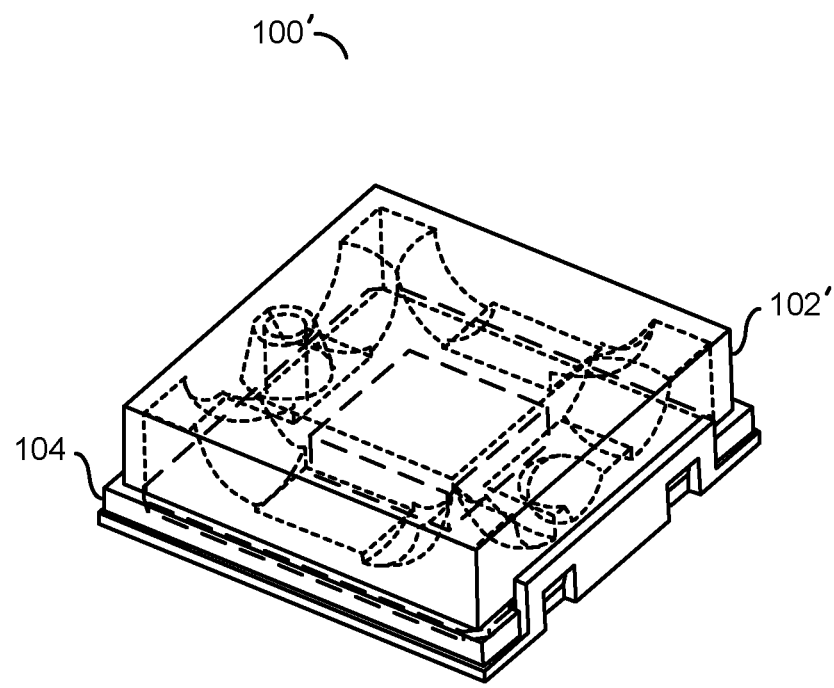
FIG. 9 is a diagram illustrating views of another example lens assembly of an integrated light/rain sensor and communication antenna module in accordance with another example embodiment of the invention.
Figure 9:
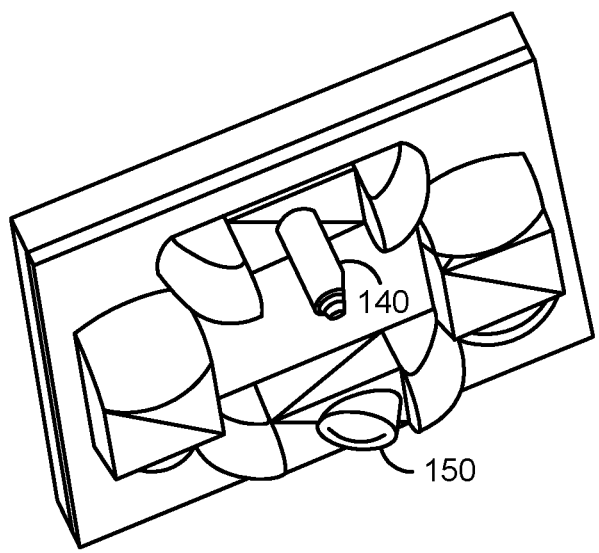

Referring to FIG. 9, a diagram is shown illustrating top (a) and bottom (b) views of another example molded lens assembly in accordance with another embodiment of the invention. In some embodiments, a molded lens assembly and cover 102' may include additional optics 140 and/or 150. In various embodiments, the additional optics 140 and/or 150 may be implemented (formed, molded, machined, etc.) in the solid filled regions 136 of one or more of the molded elongated lens features 130. In some embodiments, the optics 140 and 150 are implemented on opposite sides of the lens assembly 102'. In some embodiments, the optics 140 and 150 may be formed in adjacent features 130 of the lens assembly 102'. The additional optics 140 and 150 may be included in the molded lens assembly to facilitate automatic control of headlights and dashboard lights by sensing outside (ambient) and tunnel light levels.

Figure 10:
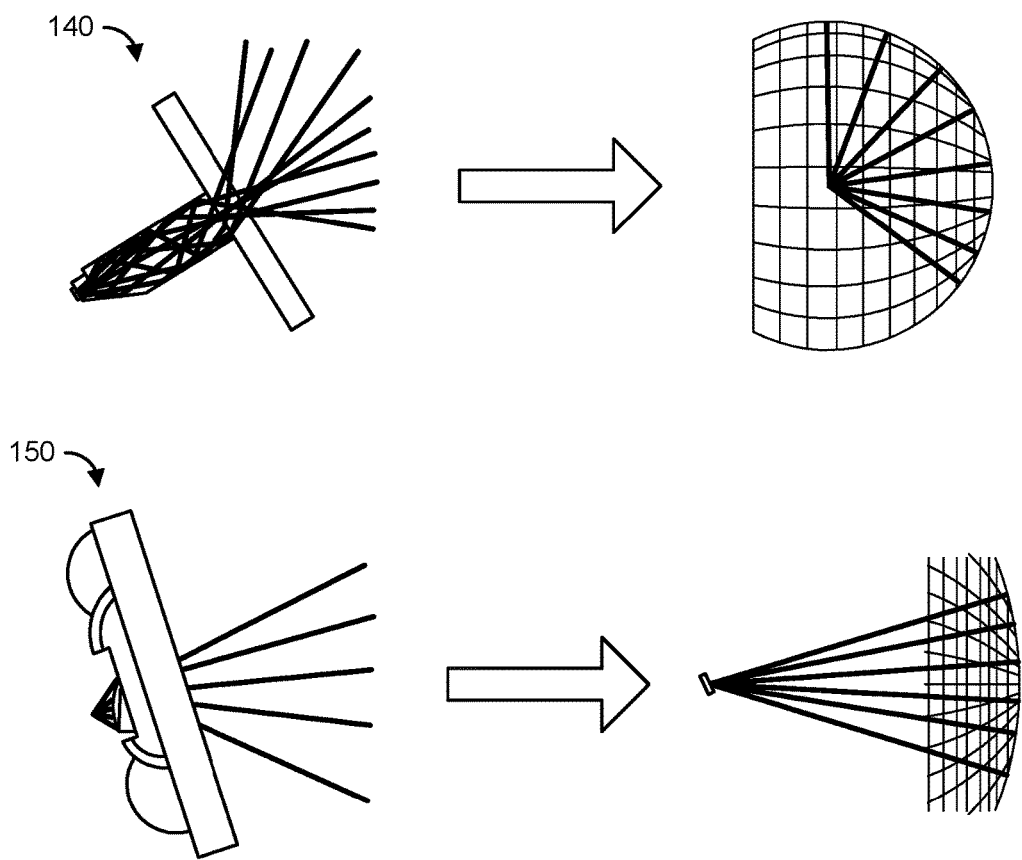
FIG. 10 is a diagram illustrating example light paths for tunnel and daylight sensors associated with the lens assembly of FIG. 9.

Referring to FIG. 10, a diagram is shown illustrating example light paths for tunnel and daylight sensors associated with the molded lens assembly of the cover 102' of FIG.

9. In some embodiments, the optics 140 and/or 150 may be included for sensing outside (ambient) and/or tunnel light levels, respectively. The optic 140 may act as a light pipe providing wide angle sunlight detection. The optic 150 may be configured to provide a narrow angle tunnel sensor.

Figure 11:
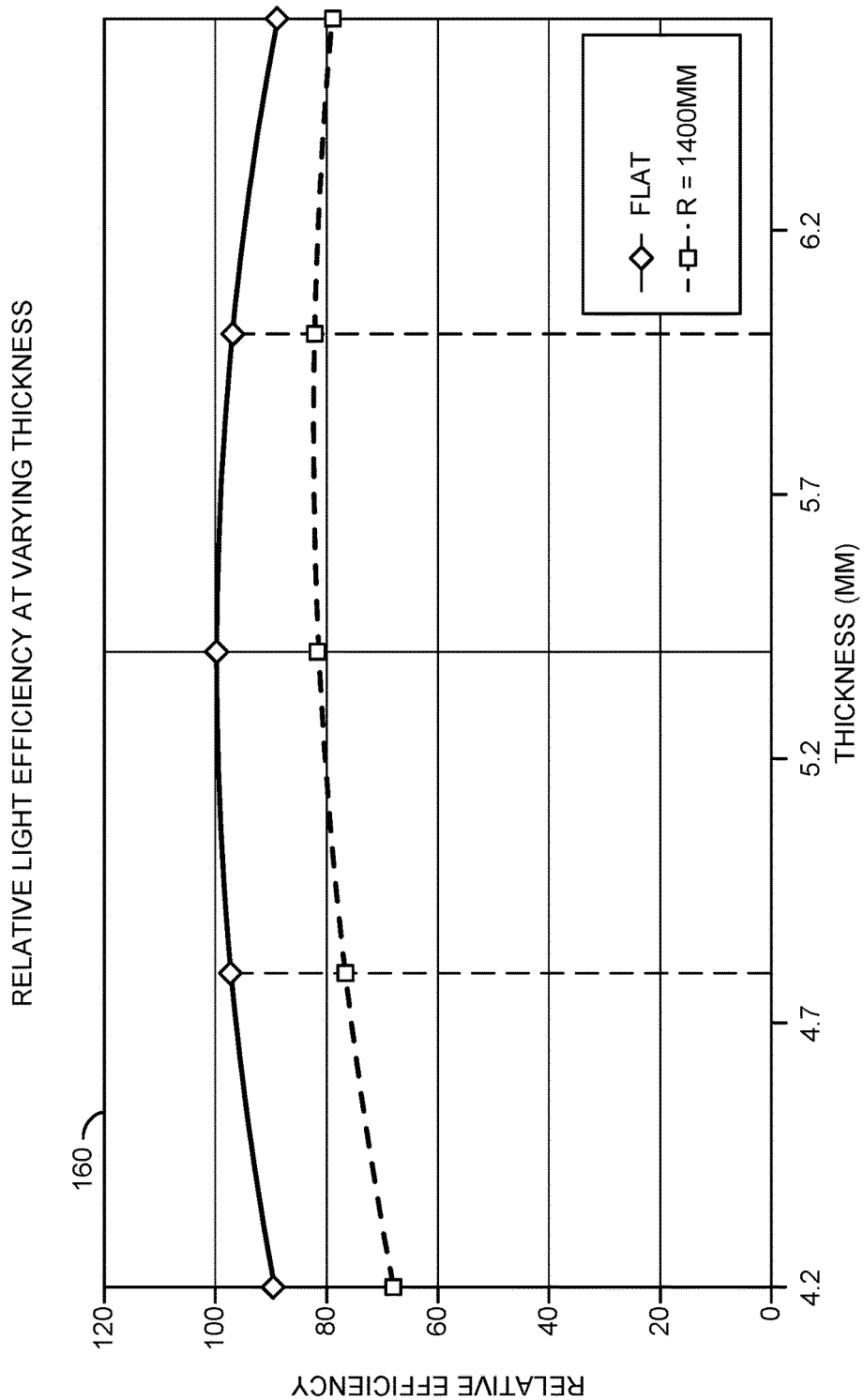
FIG. 11 is a graph illustrating a relative light efficiency at varying windshield thicknesses of an integrated light/rain sensor and communication antenna module in accordance with an embodiment of the invention.

Referring to FIG. 11, a graph 160 is shown illustrating a relative light efficiency at varying windshield thicknesses of an integrated light/rain sensor and communication antenna module in accordance with an embodiment of the invention. The graph 160 illustrates simulation of a light/rain sensor in accordance with an embodiment of the invention for windshield thickness offsets from 4.2 mm to 6.6 mm. Simulations are shown for a flat windshield and a windshield with a radius of 1400 mm (e.g., convex as seen from outside the vehicle 90). The simulation shows the light/rain sensor in accordance with an embodiment of the invention works well for a range of thicknesses (e.g., 4.8 mm to 6.0 mm) covering a majority of windshields.

Figure 12:
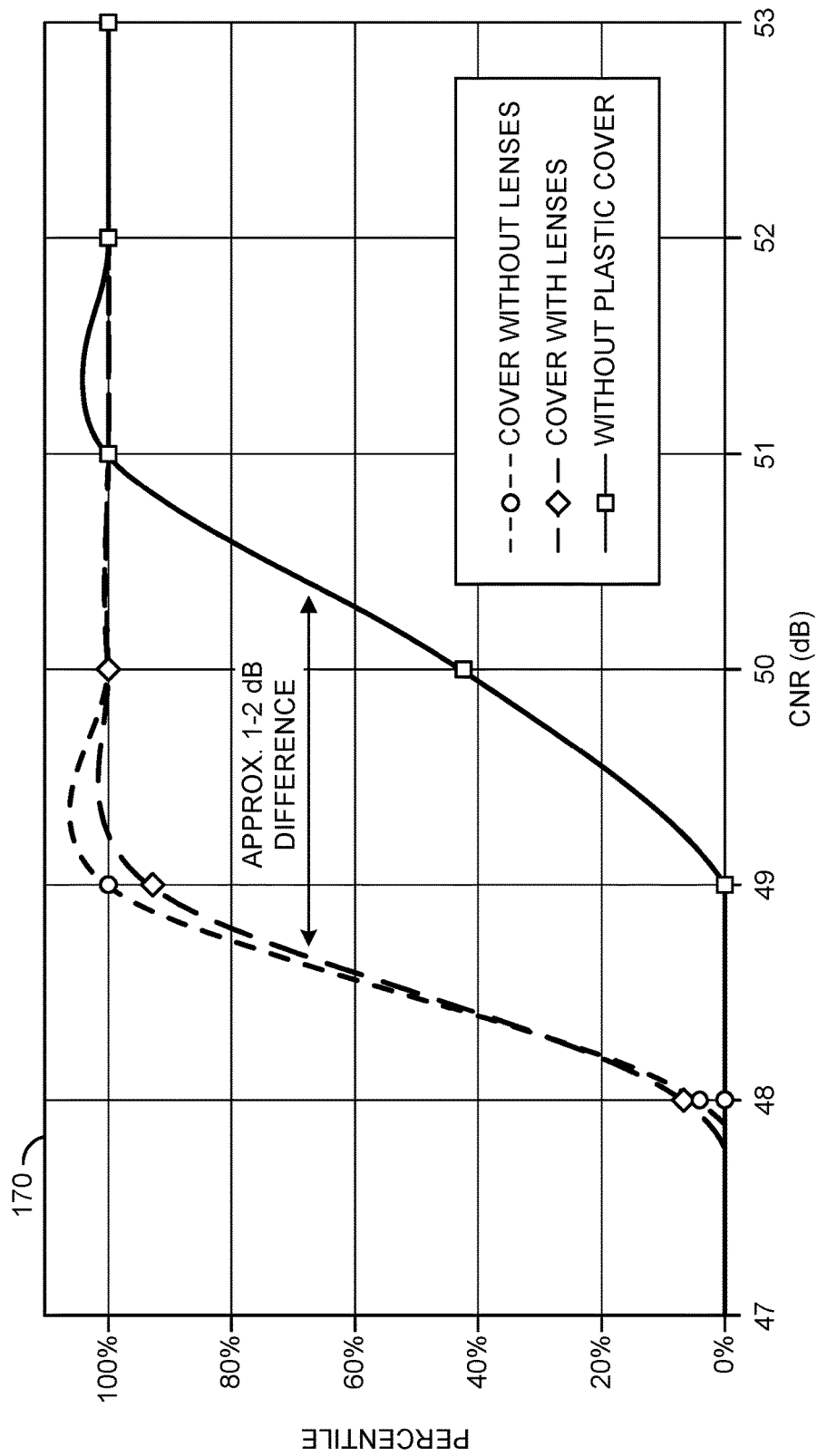
FIG. 12 is a graph illustrating carrier-to-noise ratio (CNR) of various embodiments of an integrated light/rain sensor and communication antenna module in accordance with an embodiment of the invention.

Referring to FIG. 12, a graph 170 is shown illustrating an effect of the lens assembly and cover 102 on a GPS signal. The plastic lens assembly and cover 102 with or without the molded elongated lens features 130 generally reduces the carrier-to-noise ratio (CNR) by approximately 1-2 dB. However, even with this reduction performance is still within an acceptable operating range.

Figure 13:
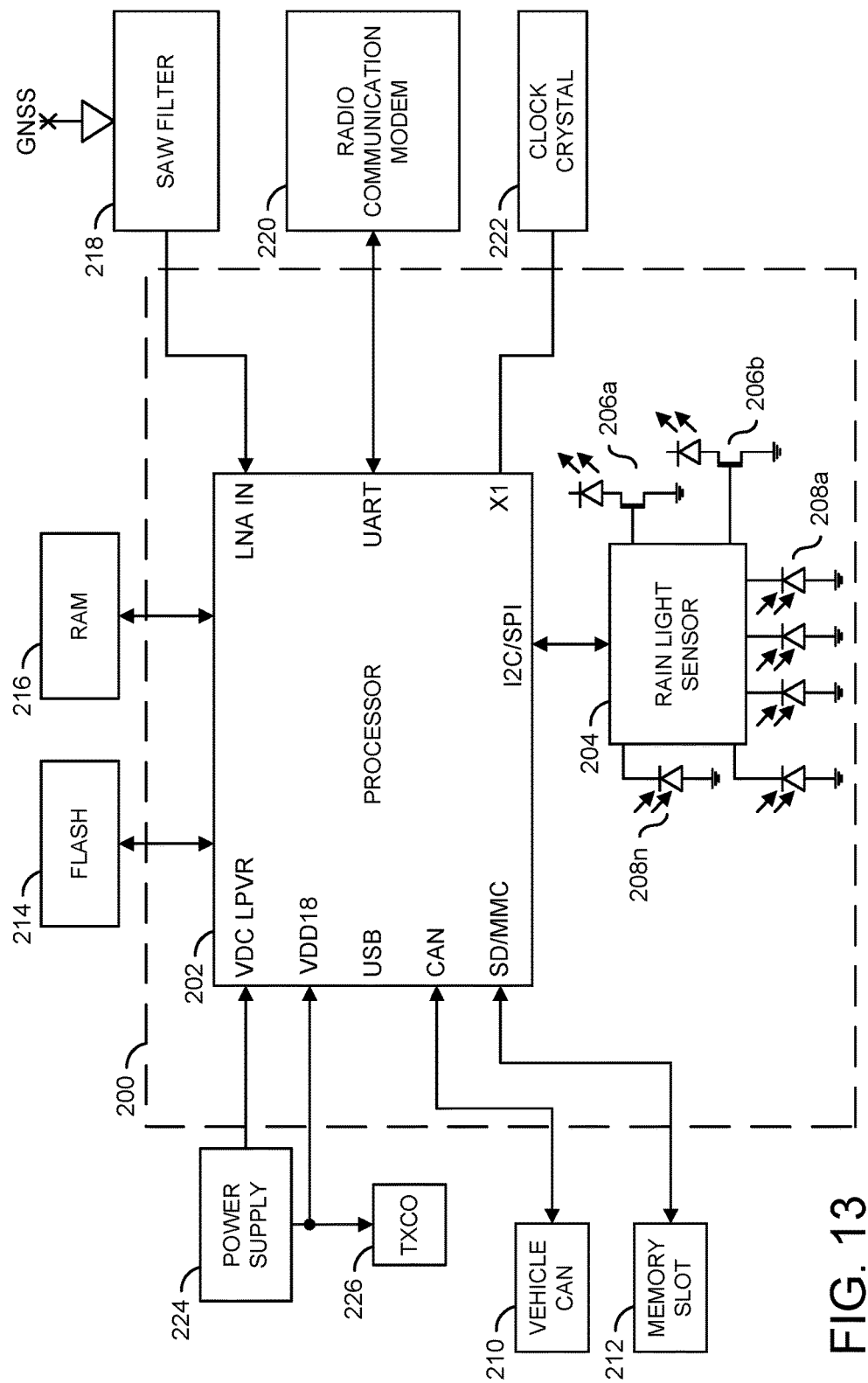
FIG. 13 is diagram illustrating an example electronics portion of an integrated light/rain sensor and communication antenna module in accordance with an embodiment of the invention.

Referring to FIG. 13, a diagram is shown illustrating an example electronics portion of an integrated light/rain sensor and communication antenna module in accordance with an embodiment of the invention. In various embodiments, electronic circuits of the integrated light/rain sensor and communication antenna module 100 are mounted on the backside of the printed circuit board 106. In an example, the electronic circuitry may comprise a processing (or control) circuit 200. In various embodiments, the control circuit 200 comprises a processor 202 and rain light sensor module 204. In an example, the rain light sensor module 204 communicates with the processor 202 via a serial communication connection (e.g., I²C, SPI, etc.). The rain light sensor module 240 may be configured to manage a pair of emitters 206a and 206b, and a number of detectors 208a-208n. The detectors 208a-208n may be divided into ambient channels and rain channels. In various embodiments, the emitter 206a and 206b may be implemented as light emitting diodes (LEDs) and the detectors 208a-208n may be implemented as photo diodes or photo transistors. In an example, the emitter 206a and 206b may be implemented as infrared or near infrared emitting diodes (e.g., OSRAM SFH 4053, available from OSRAM Opto Semiconductors GmbH) and the detectors 208a-208n may be implemented as Silicon PIN photo diodes (e.g., OSRAM SFH 2400 FA, available from OSRAM Opto Semiconductors GmbH).

The processor 202 may be connected to a number of blocks (or circuits) 210-222. In an example, the block 210 may be implemented as a vehicle CAN bus, a block 212 may implement a removable memory slot (e.g., SD, MMC, etc.), a block 214 may be implemented as a flash memory, a block 216 may be implemented as a random access memory (RAM), a block 218 may implement a surface acoustic wave (SAW) filter for receiving global navigation satellite system (GNSS) signals, a block 220 may implement a radio (e.g., cellular, GSM, UMTS, LTE, IEEE 802.11n, etc.) communication modem, and the block 222 may implement a clock crystal. The vehicle CAN bus 210 generally allows the processor 202 to control features (e.g., headlights, dash lights, windshield wipers, etc.) of the vehicle 90. The removable memory slot 212 allows the processor 202 to access extra memory and or applications (program code). In an example, the flash memory 214 may be implemented as a parallel NOR flash memory. However, other types of flash memory may be implemented accordingly to meet design criteria of a particular application. The RAM 216 may be implemented as a parallel access static RAM (SRAM). The SAW filter 218 may be configured to couple a GPS (global positioning system) or GNSS (global navigation satellite system) antenna (e.g., antenna 108) to a low noise amplifier (LNA) input of the processor 202. The modem 220 may be connected to a universal asynchronous receiver transmitter (UART) port of the processor 202. The clock crystal 222 may provide timing signals for synchronizing operations of the processing circuit 200. The circuit 202 may also be connected to a power supply 224 configured to provide one or more supply voltages (e.g., VDC LPVR, VDD18, etc.) for the circuit 200 from a battery voltage of a vehicle battery. The power supply 224 may also power a transmitter crystal oscillator (TXCO) 226.

Figure 14:
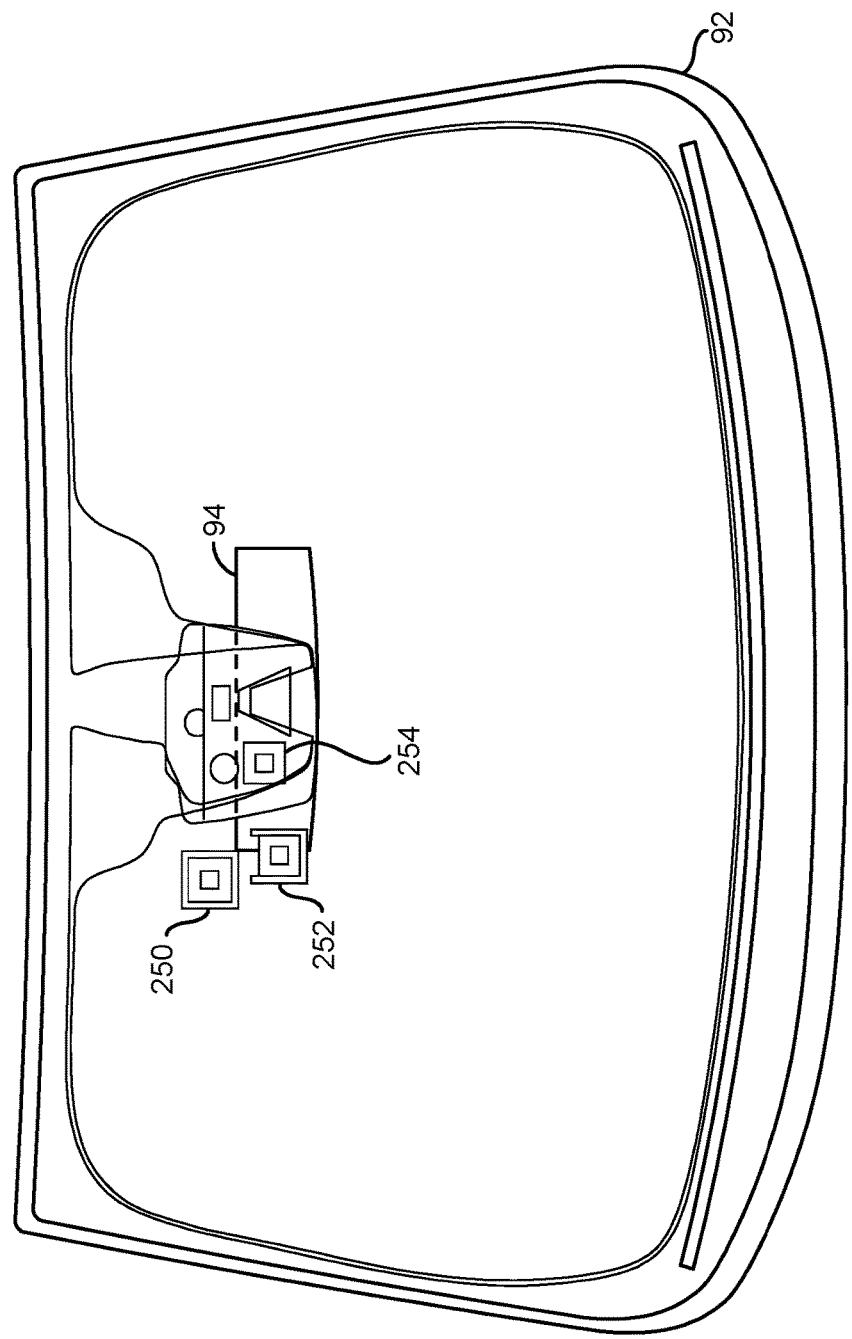
FIG. 14 is a diagram illustrating examples of alternative mountings points of an integrated light/rain sensor and communication antenna module in accordance with an embodiment of the invention.

Referring to FIG. 14, a diagram is shown illustrating example mounting points of an integrated light/rain sensor and communication antenna module in accordance with example embodiments of the invention. In various embodiments, the space behind (or near) the rearview mirror 94 of the vehicle 90 provides a desirable location for mounting the integrated light/rain sensor and communication antenna module 100. The integrated light/rain sensor and communication antenna module 100 is generally mounted on a back (interior) surface of the windshield 92 near a location where the rearview mirror is mounted. The location on the windshield behind the rearview mirror is desirable because it is wiped, it has open sky visibility, and it faces the direction of travel of the vehicle 90. In various embodiments, the integrated light/rain sensor and communication antenna module 100 is attached to the windshield 92 using a transparent adhesive material (or gasket) 254. In some embodiments, the integrated light/rain sensor and communication antenna module 100 may be attached to a the windshield 92 using a mounting frame 250 attached to the windshield 92 (illustrated in FIG. 15), or by sliding the integrated light/rain sensor and communication antenna module 100 into a groove of mounting frame attached to the windshield 92 (illustrated in FIG. 16).

Figure 15:
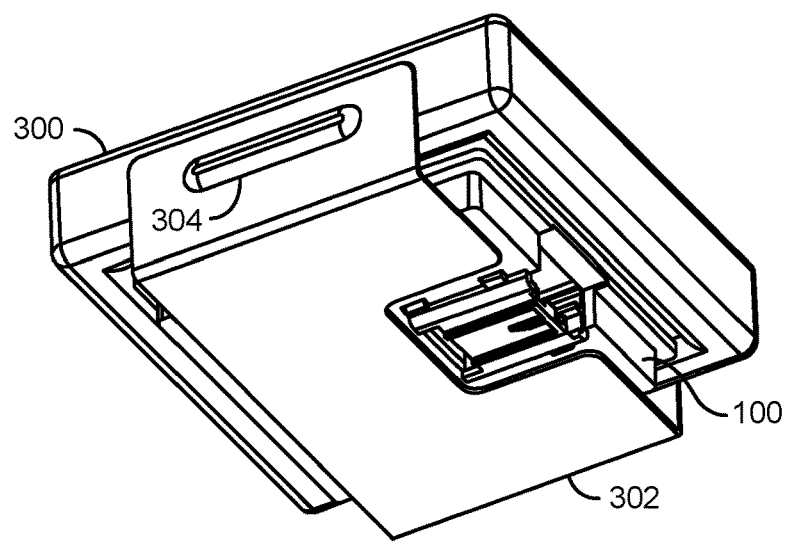
FIGS. 15 and 16 are diagrams illustrating alternative techniques of mounting an integrated light/rain sensor and communication antenna module in accordance with example embodiments of the invention.

Referring to FIG. 15, a diagram is shown illustrating an alternative technique of removably mounting the integrated light/rain sensor and communication antenna module 100 to the windshield 92. In some embodiments, the integrated light/rain sensor and communication antenna module 100 may be inserted into a mounting frame 300. The mounting frame 300 is first mounted to the windshield 92 using a transparent adhesive material (or gasket) 254. The integrated light/rain sensor and communication antenna module 100 is inserted into the mounting frame 300 and a sheet metal clip 302 is snap onto tabs 304 locking the integrated light/rain sensor and communication antenna module 100 into position. The process is simply reversed to remove the integrated light/rain sensor and communication antenna module 100.

Figure 16:
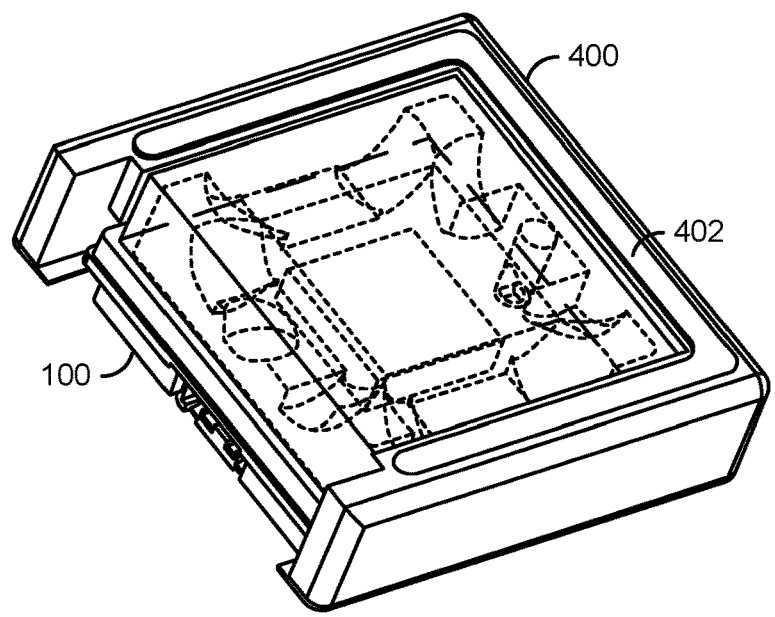

Referring to FIG. 16, a diagram is shown illustrating an alternative technique of removably mounting the integrated light/rain sensor and communication antenna module 100 in accordance with example embodiment of the invention. In some embodiments, a mounting frame 400 may be attached to the windshield 92 using, for example, an adhesive material 402. The integrated light/rain sensor and communication antenna module 100 may be configured to slide into a groove in the mounting frame 400, placing the integrated light/rain sensor and communication antenna module 100 in contact with the back (interior) surface of the windshield 92.

Figure 17:
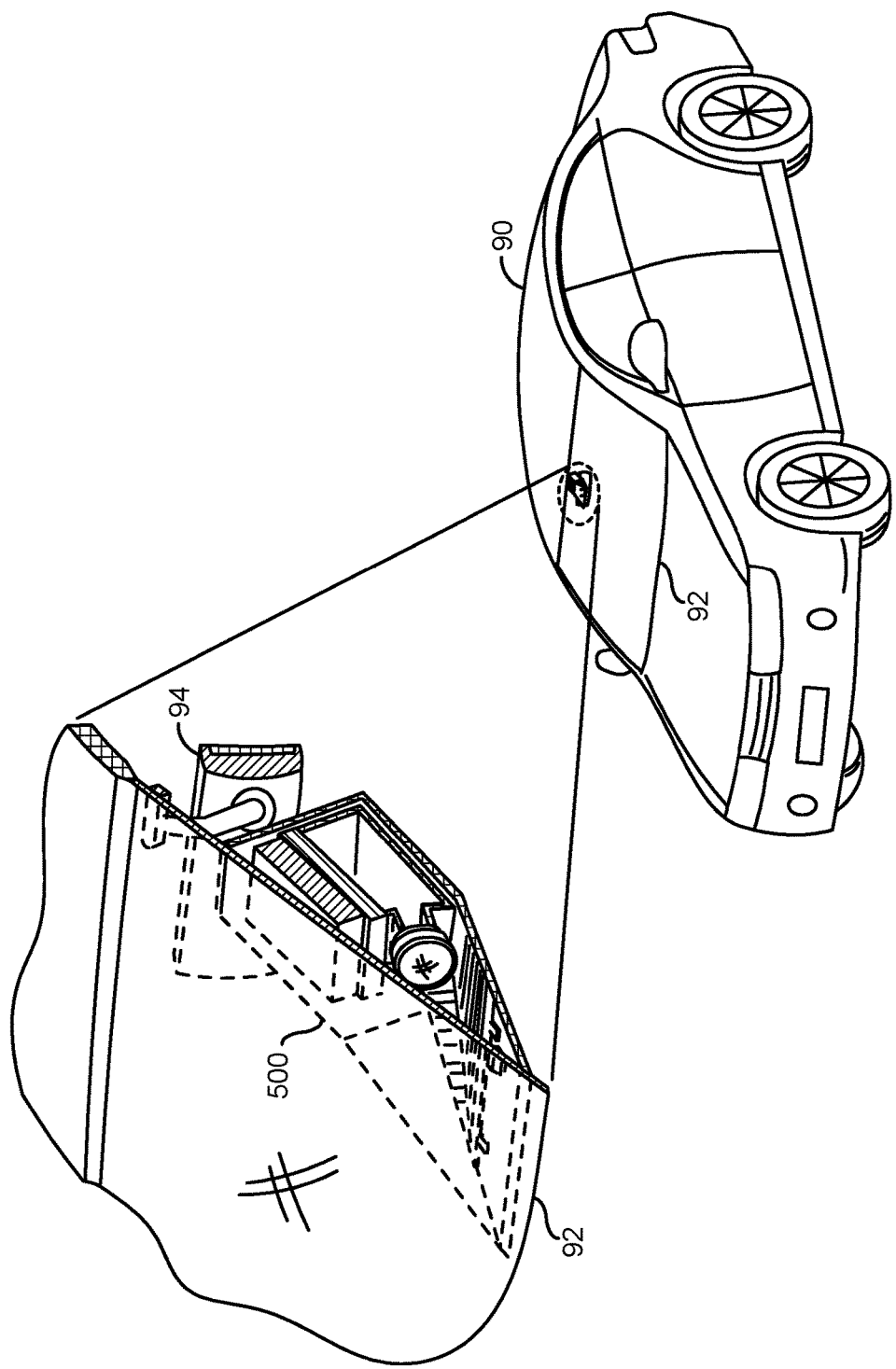
FIG. 17 is a diagram illustrating a vehicle having an integrated camera and communication antenna module in accordance with another example embodiment of the invention.

Referring to FIG. 17, a diagram is shown illustrating an integrated camera and communication antenna module in accordance with another example embodiment of the invention mounted in a vehicle context. In various embodiments, an integrated camera and communication antenna module 500 may be mounted on a backside (interior) surface of the windshield 92 of the vehicle 90. The integrated camera and communication antenna module 500 may be mounted between the windshield 92 and the rearview mirror 94 of the vehicle 90.

Figure 18:
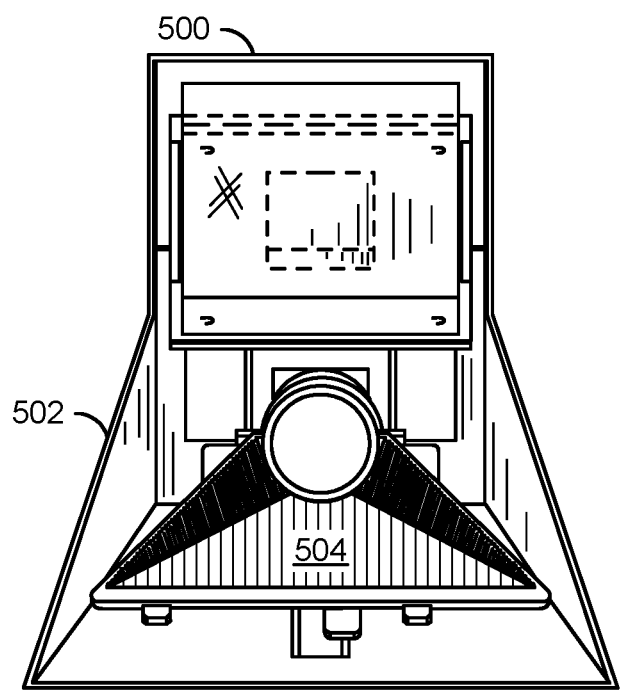
FIG. 18 is a diagram illustrating a front view of an example implementation of an integrated camera and communication antenna module in accordance with an example embodiment of the invention.

Referring to FIG. 18, a diagram is shown illustrating a front view of an example implementation of the integrated camera and communication antenna module 500 of FIG. 17. In various embodiments, the integrated camera and communication antenna module 500 may be mounted to the windshield 92 by a windshield mount 502. A light trap 504 may be attached to a camera lens of the integrated camera and communication antenna module 500.

Figure 19:
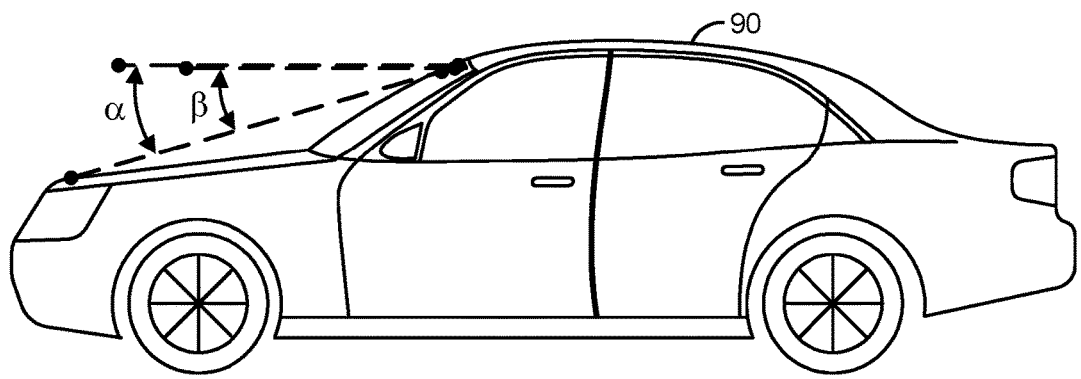
FIG. 19 is a diagram illustrating a viewing angle of the integrated camera and communication antenna module of FIG. 17.

Referring to FIG. 19, a diagram is shown illustrating a field of view angle of the integrated camera and communication antenna module 500 of FIG. 17. In general, the vehicle 90 may limit a vertical field of view of the integrated camera and communication antenna module 500 when mounted on the windshield 92. In an example, an angle α between a horizontal plane of the integrated camera and communication antenna module 500 and the front (or nose) of the vehicle 94 may be approximately 15.73 degrees. In an example, the integrated camera and communication antenna module 500 may be configured to have a field of view (FOV) of β degrees from the horizontal plane. In an example, β may be ±15 degrees. Configuring the integrated camera and communication antenna module 500 to eliminate the vehicle from the field of view generally maximizes a usable image area.

Figure 20:
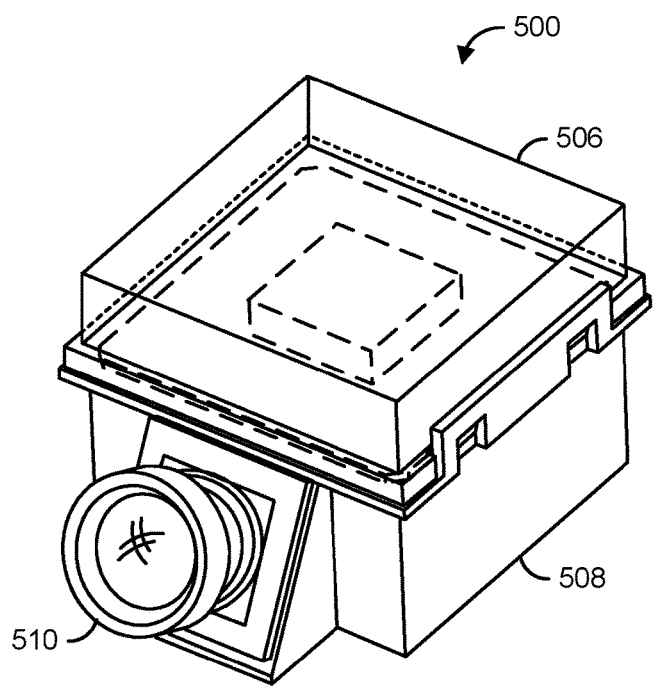
FIG. 20 is a diagram illustrating the integrated camera and communication antenna module of FIG. 17.
Figure 21:
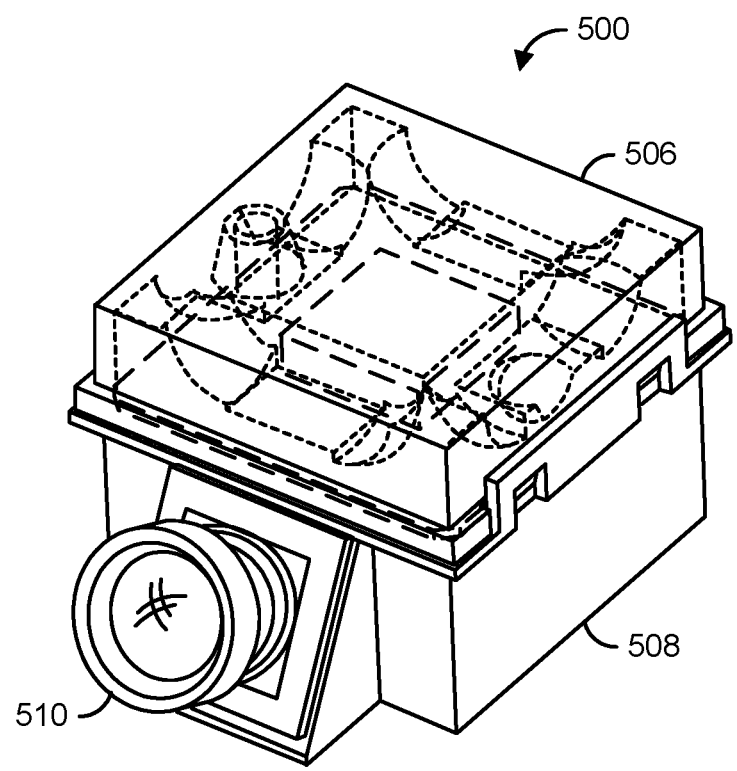
FIG. 21 is a diagram illustrating the integrated camera and communication antenna module further integrated with optional light/rain sensors.

Referring to FIGS. 20 and 21, diagrams are shown illustrating an example embodiment of the integrated camera and communication antenna module 500 of FIG. 17 with only a communication antenna assembly (FIG. 20) and further integrated with an optional light/rain sensor assembly (FIG. 21). In various embodiments, the integrated camera and communication antenna module 500 may comprise a front (or upper) cover 506 and a back (or lower) cover 508. The covers 506 and 508 generally encase a single printed circuit board with a communication antenna (illustrated by long dashed lines) mounted on a top surface and camera sensor and electronics mounted on a bottom surface (illustrated in FIG. 24).

In some embodiments, the upper cover 506 may further comprise a molded lens assembly (illustrated in FIG. 21 by short dashed lines), as described above in connection with FIG. 2. In various embodiments, the cover 506 may be formed from opaque infrared transmitting filter plastic. The molded lens assembly is generally configured to provide at least four optical paths and a central space in which the communication antenna fits. In embodiment implementing only four optical paths, the four optical paths are generally arranged orthogonally, such that adjacent optical paths are at right angles to one another (e.g., in x-y plane). In various embodiments, the orthogonal layout of the optical paths provides an open atrium (or cavity or space) in the center of the optical paths, and in which the communication antenna may be placed. In some embodiments, the molded lens assembly in the cover 506 may also include optics for sunlight sensing and tunnel light level sensing.

In various embodiments, the lower cover 508 may be configured to provide space for a light path from a camera lens 510 to the camera sensor on the backside of the printed circuit board within the integrated camera and communication antenna module 500. In various embodiments, the covers 506 and 508 may be configured to snap together for easy assembly. For example, in some embodiments a snap-fit connection may be implemented. However, other methods of assembling (fastening) the covers 506 and 508 (e.g., cementing, gluing, fusing, etc.) may be implemented.

Figure 22:
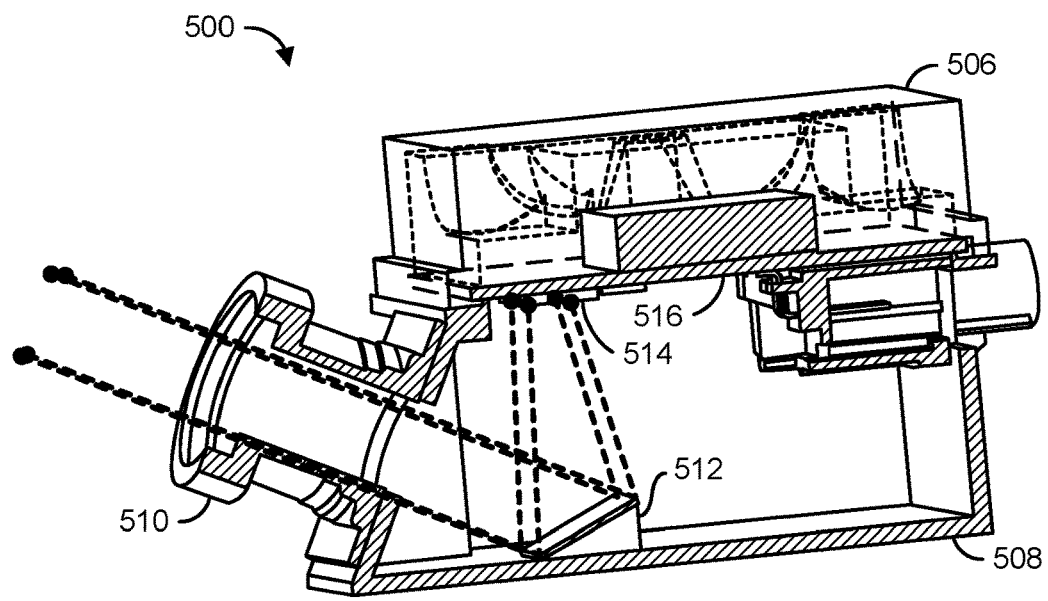
FIG. 22 is a diagram illustrating a side cut-away view of the integrated camera and communication antenna module of FIG. 21.

Referring to FIG. 22, a diagram is shown illustrating a side cut-away view of the integrated camera and communication antenna module 500 of FIG. 21. In an example, light passing through the camera lens 510 is directed onto a mirror 512 and focused onto a camera sensor 514 on the backside of a printed circuit board 516. In some embodiments, the mirror 512 may be replaced by a prism (e.g., a pentaprism). In some embodiments, the camera sensor 514 may comprise a fully integrated system-on-chip (SoC) automotive image sensor combining high-definition (HD) video (e.g., 720p/30, etc.) with color high dynamic range (HDR) functionality. The camera sensor 514 may be configured for wide field of view and multi-camera applications. The camera sensor 514 may have an ability to simultaneously deliver high-quality video and scene information content, allowing the camera sensor 514 to support automotive applications that involve concurrent vision and sensing functions. In an example, the camera sensor 514 may configured to provide fully-processed, display-ready color HDR video output in 8- or 10-bit YUV format, or 10- to 18-bit combined RAW RGB HDR output with complete user control over formatting and data transfer. The integrated camera and communication antenna module 500 generally allows next-generation camera interfaces and advanced automotive system architectures, such as Ethernet-based, vehicle-to-vehicle (V2V), and vehicle-to-infrastructure (V2I) driver assistance solutions.

Figure 23:
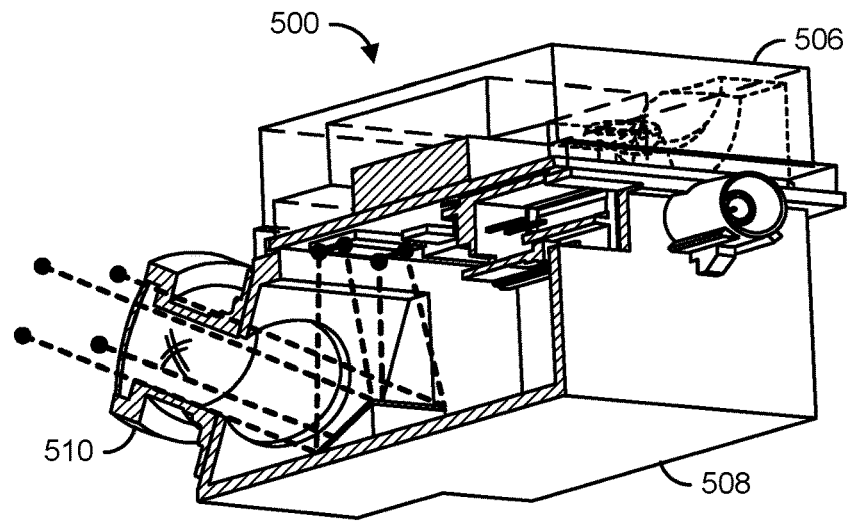
FIG. 23 is a diagram illustrating the cut-away view of the integrated camera and communication antenna module of FIG. 22 from the rear.

Referring to FIG. 23, a diagram is shown illustrating the cut-away view of the integrated camera and communication antenna module 500 of FIG. 22 rotated to expose a rear elevation.

Figure 24:
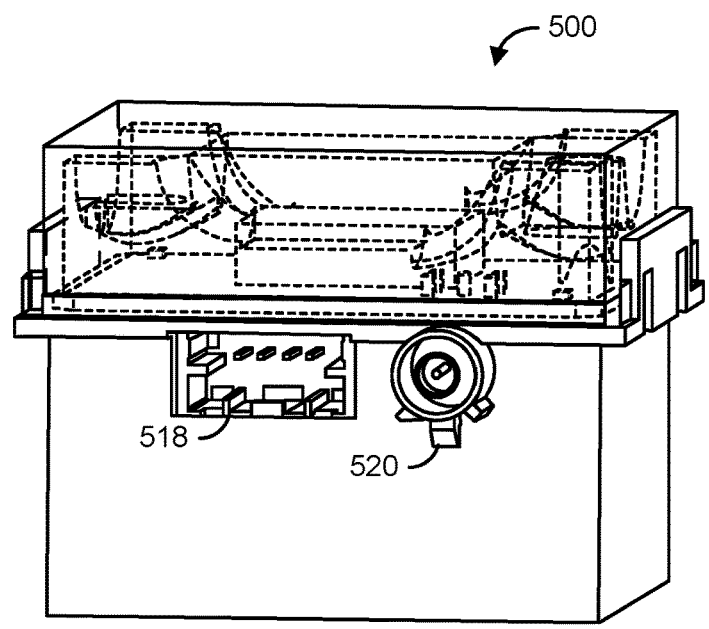
FIG. 24 is a diagram illustrating example connectors of the integrated camera and communication antenna module of FIG. 22.

Referring to FIG. 24, a diagram is shown illustrating example connections of the integrated camera and communication antenna module 500. In an example, the integrated camera and communication antenna module 500 may have a connector 518 and a connector 520. The connector 518 may be implemented using a MOLEX Mini50 connection system. The connector 520 may be implemented using a MOLEX FAKRA connector system (e.g., a RF connection and/or video FPD-Link III link).

Figure 25:
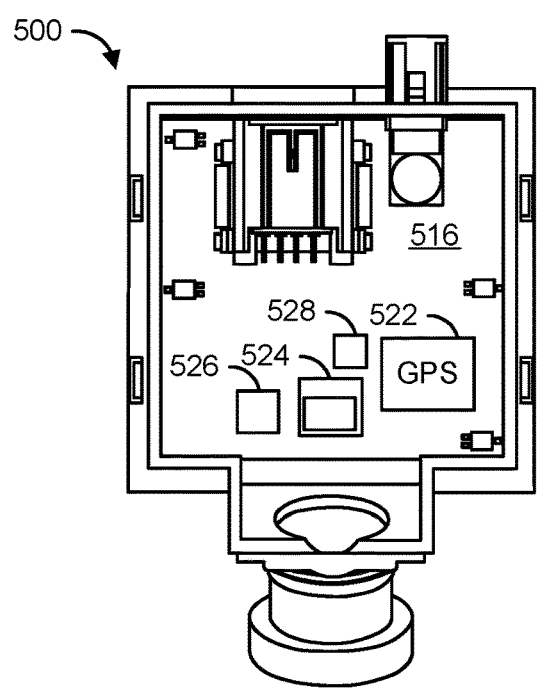
FIG. 25 is a diagram illustrating a layout of a bottom surface of a printed circuit board of the integrated camera and communication antenna module in accordance with and example embodiment of the invention.

Referring to FIG. 25, a diagram is shown illustrating a layout of the bottom surface of the printed circuit board 516 in accordance with and example embodiment of the invention. In various embodiments, a number of integrated circuits (or chips) may be mounted on the backside of the printed circuit board 516. In an example, the number of chips may include, but are not limited to, a GPS chipset 522, a camera sensor chip 524, a serializer chip 526, and an optional rain/light sensor chip 528. In embodiments with the rain/light sensor capability, the printed circuit board 516 would also comprise sets of emitters (e.g., IRLEDs) and sets of detectors (e.g., photodiodes or photo-transistors). In an example, the chip 522 may be implemented with a fully integrated GPS/Galileo/Glonass/BeiDou/QZSS receiver with high performance processing capability (e.g., a TESEO STA8090EXG chip from STMicroelectronics). The chip 524 may be implemented as a automotive image sensor chip (e.g., an Omni Vision OV10635 camera sensor chip from OmniVision Technologies). The chip 526 may be implemented using a 25 MHZ to 100 MHz 10/12-bit FPD-Link III Serializer (e.g., a DS90UB913A serializer chip from Texas Instruments). The optional rain/light sensor chip 528 may be implemented using a Melexis MLX75308 rain sensor chip.

Figure 26:
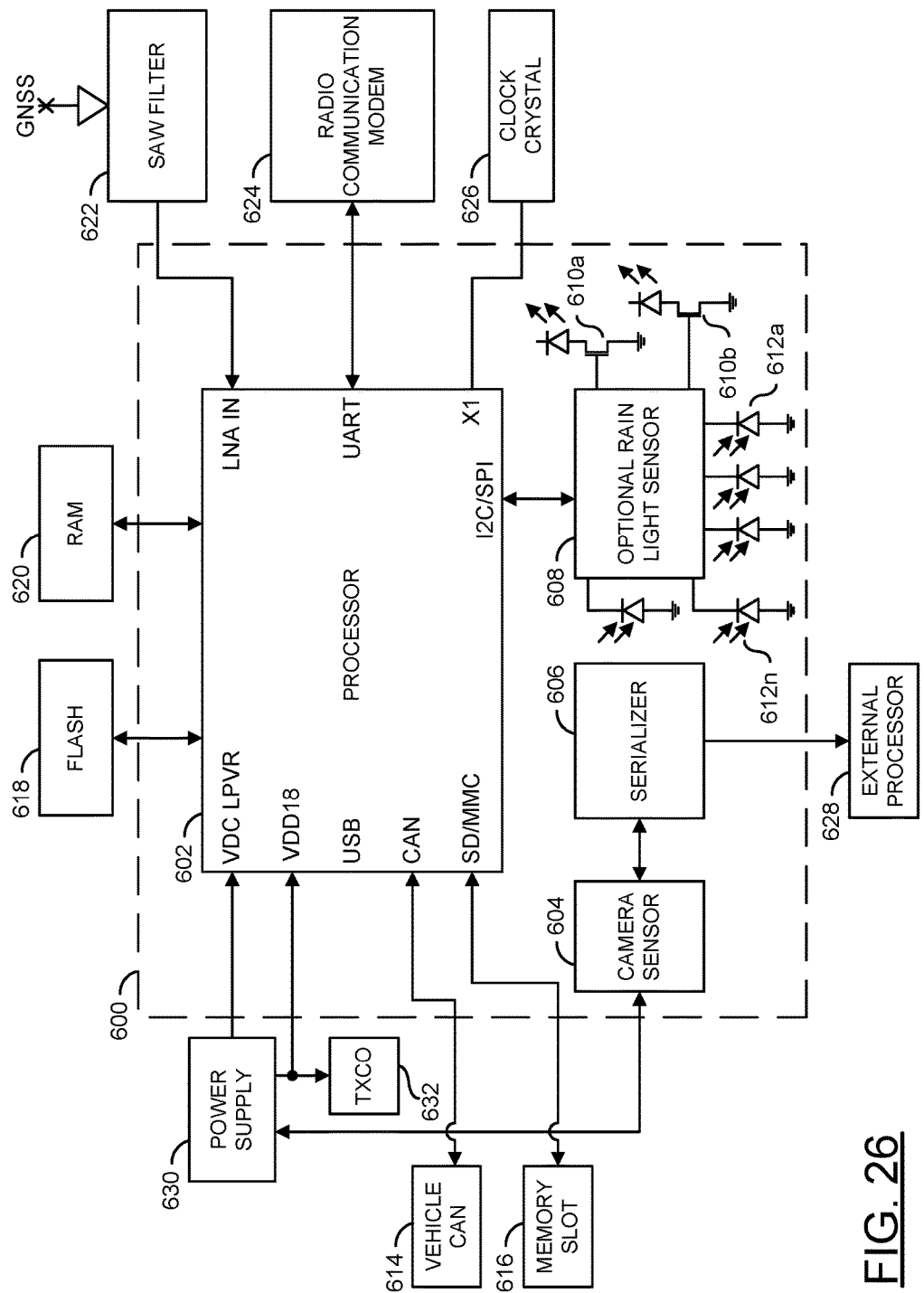
FIG. 26 is a diagram illustrating an example electronics portion of an integrated camera and communication antenna module in accordance with an example embodiment of the invention.

Referring to FIG. 26, a diagram is shown illustrating an example electronics portion of an integrated camera and communication antenna module in accordance with an example embodiment of the invention. In various embodiments, electronic circuits of the integrated camera and communication antenna module 500 are mounted on the backside of the printed circuit board 506. In an example, the electronic circuitry comprises a processing (or control) circuit 600. The control circuit 600 comprises a processor 602, a camera sensor 604 and a serializer 606. In embodiments including a light/rain sensing capability, the control circuit 600 may also comprise an optional rain light sensor module 608.

The optional rain light sensor module 608 may be connected to the processor 602 via a serial communication connection bus (e.g., I²C, SPI, etc.). The rain light sensor module 608 may be configured to managed a pair of emitters 610a and 610b, and a number of detectors 612a-612n. The detectors 612a-612n may be divided into ambient channels and rain channels. In various embodiments, the emitters 610a and 610b may be implemented as light emitting diodes (LEDs) and the detectors 612a-612n may be implemented as photo diodes or photo transistors. In an example, the emitters 610a and 610b may be implemented as infrared or near infrared emitting diodes.

In various embodiments, the processor 602 may be implemented as an embedded processor or controller (e.g., an ARM core, etc.). The processor 602 may be connected to a number of blocks (or circuits) 614-626. In an example, the block 614 may represent a vehicle CAN (controller are network) bus, a block 616 may implement a removable memory slot (e.g., SD, MMC, etc.), a block 618 implements a flash memory, a block 620 may implement a random access memory (RAM), a block 622 may implement a surface acoustic wave (SAW) filter, a block 624 implementing a radio communication (e.g., cellular, GSM, UMTS, LTE, WiFi, IEEE 802.11n, etc.) modem, and the block 626 may implement a clock crystal.

The processor 602 may be configured to control features (e.g., headlights, dash lights, windshield wipers, etc.) of a vehicle via the vehicle CAN bus 614. The processor 602 may also be configured to exchange inertial measurement unit (IMU) data with the vehicle 90 via the vehicle CAN bus 614. In various embodiments, the processor 602 may be configured to support either standard ISO 15765 or extended ISO 15765 protocols. However, other protocols may be implemented, including, but not limited to, ISO 15764-4 (CAN), ISO 14230-4 (Keyword Protocol 2000), ISO 9141-2 (Asian, European, Chrysler vehicles), SAE J1850 VPW (GM vehicles), SAE J1850 PWM (Ford vehicles), SAE J2411 (GM LAN, single wire CAN), and Ford MSC (medium speed CAN).

The removable memory slot 616 allows the processor 602 to access extra memory (e.g., SD/MMC cards), applications (program code), subscriber information modules (e.g., SIM cards), etc. In an example, the flash memory 618 may be implemented as a parallel NOR flash memory. However, other types of flash memory may be implemented accordingly to meet design criteria of a particular application. In an example, the RAM 620 may be implemented as a parallel access static RAM (SRAM). However, other types of RAM may be implemented accordingly to meet design criteria of a particular application. The SAW filter 622 may be configured to couple a GPS (global positioning system) or GNSS (global navigation satellite system) antenna (e.g., antenna 108) to a low noise amplifier (LNA) input of the processor 602. The modem 624 may be connected to a universal asynchronous receiver transmitter (UART) port of the processor 602. The clock crystal 626 may provide timing signals (e.g., reference clock) for synchronizing operations of the processing circuit 600. The circuit 602 may also be connected to a power supply 630 configured to provide one or more supply voltages (e.g., VDC LPVR, VDD18, etc.) for the circuit 600 from a battery voltage of a vehicle battery.

The camera sensor 604 and serializer 606 are generally connected together and configured to convert an image focused on the camera sensor 604 into a serial bitstream containing image data (e.g., pixels, synchronization signals, etc.). The serializer 608 may be configured to communicate the serial bitstream (e.g., via serial peripheral interface or SPI) to an external processor 628 for further processing. In an example, the external processor 628 may be part of an automated driver assistance system (ADAS) configured to provide warnings (e.g., lane incursion, collision, lane crossing, etc.) and/or control features of the vehicle (e.g., brakes, navigation, etc.).

Figure 27:
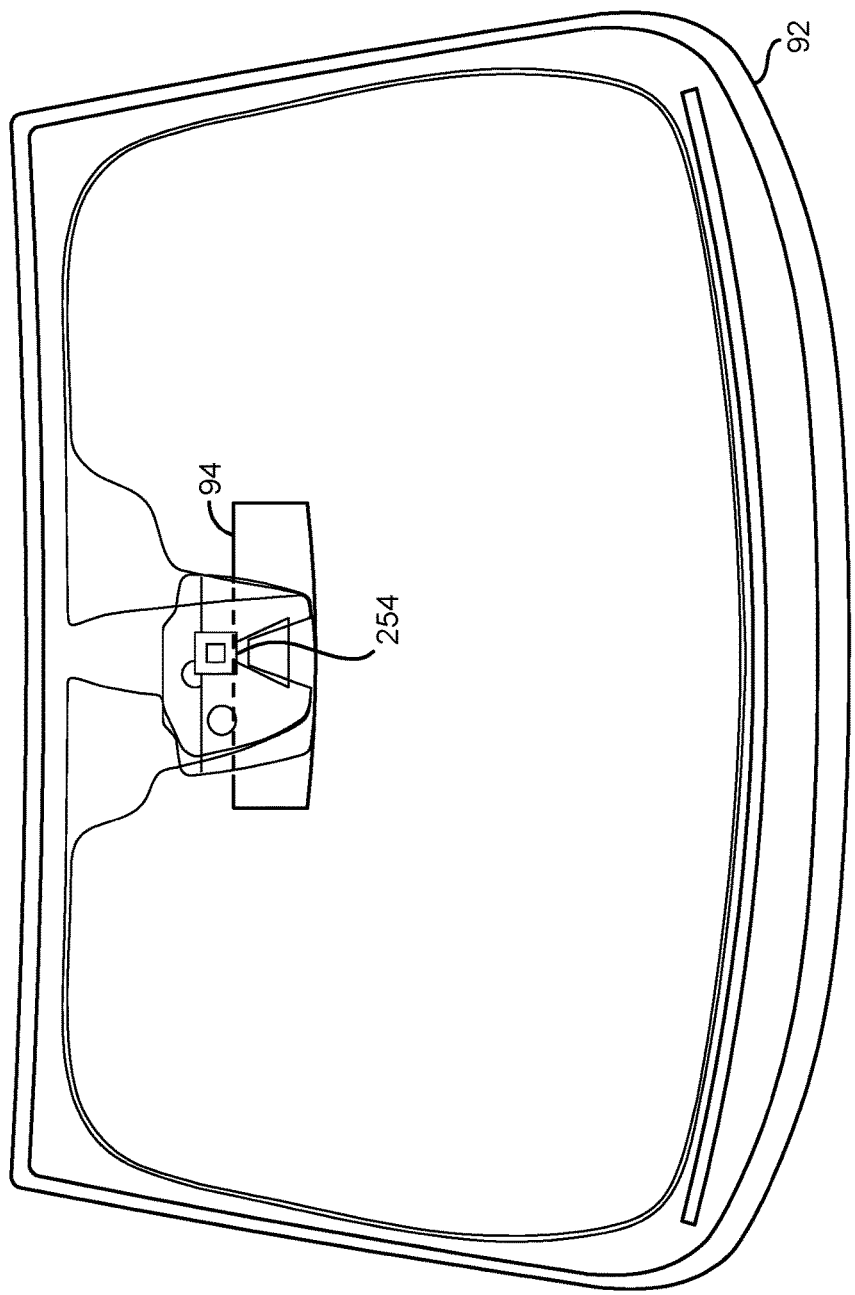
FIG. 27 is a diagram illustrating example a mounting points of an integrated camera and communication antenna module in accordance with an example embodiment of the invention.

Referring to FIG. 27, a diagram is shown illustrating example mounting points of a rain sensor and the integrated camera and communication antenna module 500 in accordance with an example embodiment of the invention. In various embodiments, the space behind the rearview mirror of the vehicle 94 provides a desirable location for mounting the integrated camera and communication antenna module 500. The integrated camera and communication antenna module 500 is generally mounted on a back (inner) surface of the windshield 92 near a location where the rearview mirror 94 of the vehicle 90 is mounted. The location on the windshield behind the rearview mirror 94 is desirable because it is wiped, it has open sky visibility, and it faces the direction of travel of the vehicle 94. In various embodiments, the integrated camera and communication antenna module 500 is attached to the windshield 92 using a transparent adhesive material (or gasket). In some embodiments, a light/rain sensor may be integrated in the integrated camera and communication antenna module 500 or attached to a separate location on the windshield 92.

Figure 28:
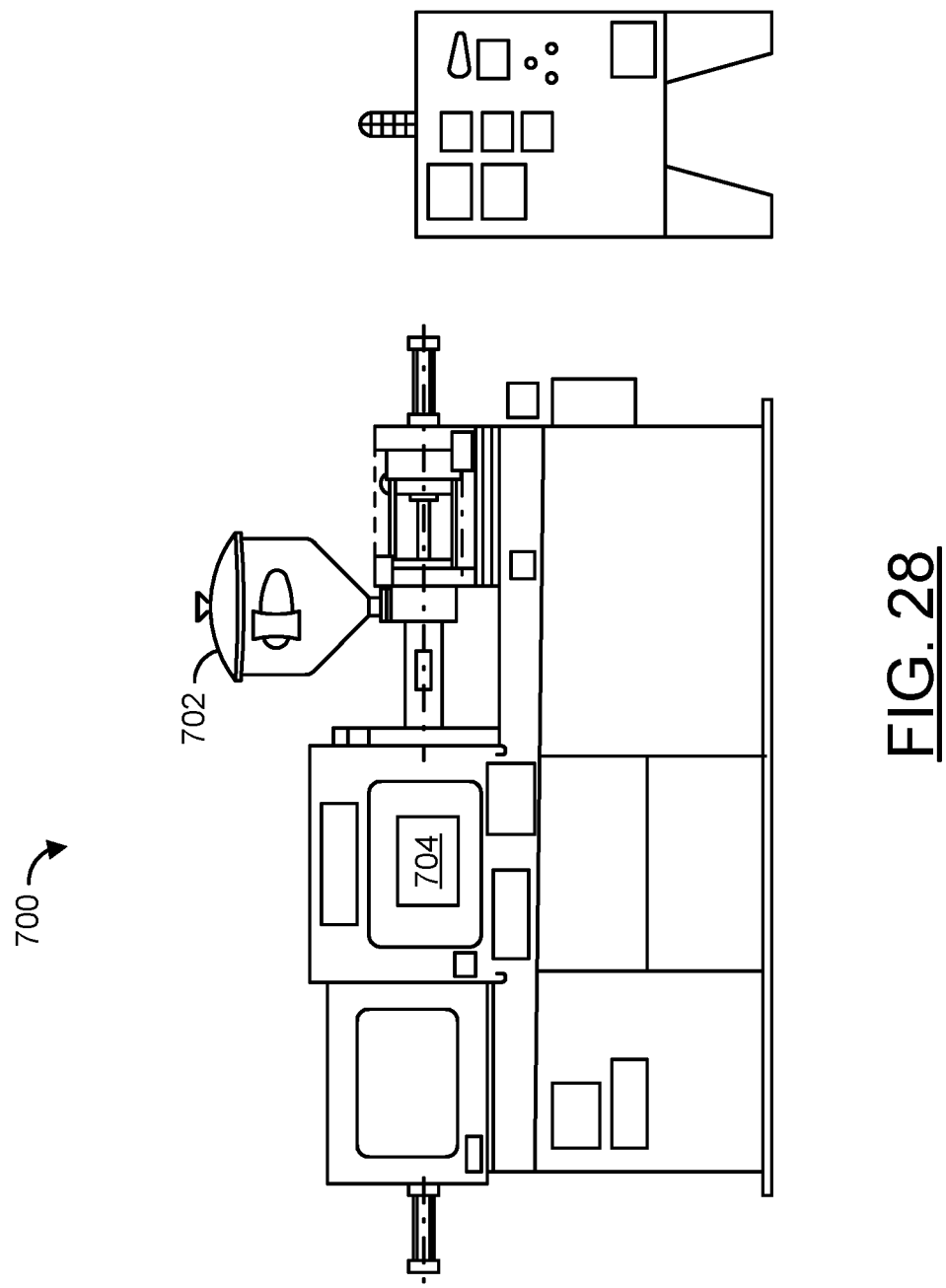
FIG. 28 is a diagram illustrating an example of an injection molding machine configured to manufacture a lens assembly in accordance with an example embodiment of the invention.

Referring to FIG. 28, a diagram of an injection molding machine 700 illustrating an example process for manufacturing a lens assembly and cover in accordance with an example embodiment of the invention. In an example, a process (or method) of manufacturing a molded lens assembly and cover as described above in connections with FIG. 2) may comprise loading resin pellets into a hopper 702 of the injection molding machine 700. In various embodiments, the resin pellets may comprise a dielectric, microwave and infrared transparent, moldable plastic material (e.g., an acrylic infrared transmitting resin). The injection molding machine 700 may be configured to heat the resin pellets until molten and inject the molten resin into a mold 704. The mold 704 is configured to form a molded lens assembly and cover in accordance with an example embodiment of the invention from the molten resin. The injection molding machine 700 cools the mold 704 until the molten resin has set. The molded lens assembly and cover in accordance with an example embodiment of the invention is then removed from the mold and the process repeated.

The mold 704 is generally configured to form at least one molded lens assembly and cover. In an example embodiment, the molded lens assembly and cover generally comprises a substantially planar cover portion having sides extending down at a periphery of the planar portion and four molded elongated features extending away from the planar portion and arranged such that adjacent molded elongated features are perpendicular to each other and define a rectilinear space. Each molded elongated feature comprises a first convex lens portion and a second convex lens portion. In some embodiments, the mold may be further configured to form one or more filled regions between the first convex lens portion and the second convex lens portion. In some embodiments, the mold may be further configured to form one or more features for supporting one or more of (i) ambient light sensing, (ii) tunnel detection, and (iii) sunload sensing. The additional features may be formed in the one or more filled regions between the first convex lens portion and the second convex lens portion.

Other methods besides molding may be used to form a lens assembly and cover in accordance with an embodiment of the invention. For example, techniques exist and are being developed for producing lenses using three-dimensional (3D) printing. In some embodiments, a lens assembly and cover in accordance with an embodiment of the invention may be manufactured using such a 3D printing technique.

In various aspects, embodiments of the invention may include, but are not limited to an integrated rain/light sensor and communication antenna module, an integrated camera and communication antenna module, and a molded lens assembly for use with the rain/light sensors. The rain sensor generally cannot be reduced in size without affecting performance. The larger the surface of the windshield sensed, the more accurate the estimate of the rain fallrate may be for wiper speed control. A minimum gap is necessary between the emitter and the photodiodes of the rain/light sensor.

The lens assembly is generally configured to efficiently couple light from the emitter(s) into the windshield. A large sensing area on the front surface is, in general, more sensitive. The molded lens assembly in accordance with an example embodiment of the invention may provide a footprint/sensing area on the front surface of the windshield comprising four patches of light approximately 5×5 mm with more intense light, and almost reaching 10×10 mm per patch. The rain/light sensor in accordance with an example embodiment of the invention may accommodate different near infrared (NIR) transmittances (e.g., 16-85%), different windshield thicknesses (e.g., 4.2 mm to 6.0 mm) and material, and windshield curvature greater than or equal to 1400 mm at sensor position. In general, the refractive index, n, of the windshield is assumed to be close to 1.5. The bond between the optics of the molded lens assembly and the windshield need to have n close to 1.5. In various embodiments, a carrier/substrate (or planar) portion of the molded lens assembly has a thickness of approximately 2.0 mm. The thickness of the planar portion may be increased if needed.

In an example, a rain sensor designed in accordance with an embodiment of the invention, using miniature SMD infrared emitters and through hole photo diode detectors, may fit in a space of approximately 12.7 mm between the windshield and the printed circuit board using simple refractive optics for the emitters and photo diodes. In an example, two LEDs (IREDs) and two photodiodes may be optically coupled by a molded lens assembly in accordance with an embodiment of the invention. Each LED provides light to both photodiodes. A detector area 0.6×0.6 to 1×1 mm$^2$ may be implemented. A smaller area may provide tighter tolerances due to mounting, different thicknesses, curvatures, etc.

About 20% of the light emitted by the emitter reaches the detectors with the design described above (not considering attenuation in the windshield). In an example, the detectors (with visible cut) may be implemented using SFH2400 FA photo diodes; the emitters may be implemented with vsmy1850 or SFH 4053 LEDs; a sun (e.g., visible wavelength) detector may be implemented using a SFH3410 photo diode.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A molded lens assembly comprising:
a cover having a substantially planar portion and side portions extending away perpendicularly at a periphery of said substantially planar portion and defining an inner surface of said substantially planar portion; and
at least four molded elongated features extending away from said inner surface of said substantially planar portion and arranged such that a long axis of each of said molded elongated features is aligned with a side of a polygon having a number of sides equal to the number of molded elongated features, wherein each molded elongated feature comprises a first convex lens portion at a first end and a second convex lens portion at a second end, and one or more of said molded elongated features further comprise a filled region between said first convex lens portion and said second convex lens portion.

2. The molded lens assembly according to claim 1, further comprising one or more molded features, in said one or more filled regions, and configured to support one or more of (i) ambient light sensing, (ii) tunnel detection, and (iii) sunload sensing.

3. The molded lens assembly according to claim 1, wherein said cover and said molded elongated features are comprised of a plastic material.

4. The molded lens assembly according to claim 3, wherein said plastic material comprises a dielectric material.

5. The molded lens assembly according to claim 3, wherein said plastic material comprises a microwave and infrared transparent material.

6. The molded lens assembly according to claim 3, wherein said plastic material comprises a dielectric, microwave and infrared transparent, moldable plastic material.

7. The molded lens assembly according to claim 3, wherein said plastic material comprises an acrylic infrared transmitting resin.

8. The molded lens assembly according to claim 7, wherein said acrylic infrared transmitting resin is formulated to block or absorb one or more of ultraviolet light and visible light.

9. The molded lens assembly according to claim 1, wherein each of said first convex lens portion and said second convex lens portion is configured to collimate light received at the convex surface at an angle through said planar portion of said cover toward a plane bisecting a long axis of the molded elongated feature.

10. The molded lens assembly according to claim 9, wherein each of said convex lens portions is configured to focus light received at said angle through said planar portion of said cover toward respective focal points of said convex lens portions.

11. A mold configured to form at least one molded lens assembly, said molded lens assembly comprising:
- a substantially planar cover portion having sides extending down at a periphery of the planar portion; and
- four molded elongated features extending away from the planar portion and arranged such that adjacent molded elongated features are perpendicular to each other and define a rectilinear space, wherein each molded elongated feature comprises a first convex lens portion, a second convex lens portion and a filled region between said first and said second convex lens portions.

12. The mold according to claim 11, further configured to form in one or more of said filled regions, one or more features configured to support one or more of (i) ambient light sensing, (ii) tunnel detection, and (iii) sunload sensing.

13. A method of manufacturing a molded lens assembly comprising:
- loading resin pellets into a hopper of an injection molding machine containing a mold configured to form at least one molded lens assembly, said molded lens assembly comprising a substantially planar cover portion having sides extending down at a periphery of the planar portion and four molded elongated features extending away from the planar portion and arranged such that adjacent molded elongated features are perpendicular to each other and define a rectilinear space, wherein each molded elongated feature comprises a first convex lens portion, a second convex lens portion, and a filled region between said first and said second convex lens portions;
- heating the resin pellets until molten;
- injecting the molten resin into the mold; and
- cooling the mold until the molten resin has set.

14. The method of manufacturing a molded lens assembly according to claim 13, wherein said resin pellets comprise a dielectric material.

15. The method of manufacturing a molded lens assembly according to claim 13, wherein said resin pellets comprise a microwave and infrared transparent material.

16. The method of manufacturing a molded lens assembly according to claim 13, wherein said resin pellets comprise a dielectric, microwave and infrared transparent, moldable plastic material.

17. The method according to claim 13, wherein said resin pellets comprise an acrylic infrared transmitting resin.

18. The method according to claim 17, wherein said acrylic infrared transmitting resin is formulated to block or absorb one or more of ultraviolet light and visible light.

19. A molded lens assembly comprising:
- a cover having a substantially planar portion and side portions extending away perpendicularly at a periphery of said substantially planar portion and defining an inner surface of said substantially planar portion; and
- at least four molded elongated features extending away from said inner surface of said substantially planar portion and arranged such that a long axis of each of said molded elongated features is aligned with a side of a polygon having a number of sides equal to the number of molded elongated features, wherein each molded elongated feature comprises a first convex lens portion at a first end and a second convex lens portion at a second end, wherein said cover and said molded elongated features are comprised of an acrylic infrared transmitting resin formulated to block or absorb one or more of ultraviolet light and visible light.

* * * * *